United States Patent
Lavretsky et al.

(10) Patent No.: US 10,852,748 B2
(45) Date of Patent: *Dec. 1, 2020

(54) METHODS AND APPARATUS TO PERFORM OBSERVER-BASED CONTROL OF A VEHICLE

(71) Applicant: The Boeing Company, Chicago, IL (US)

(72) Inventors: Eugene Lavretsky, Los Angeles, CA (US); Kevin Andrew Wise, St. Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/271,106

(22) Filed: Feb. 8, 2019

(65) Prior Publication Data

US 2019/0171233 A1    Jun. 6, 2019

Related U.S. Application Data

(63) Continuation of application No. 15/465,066, filed on Mar. 21, 2017, now Pat. No. 10,216,198.

(51) Int. Cl.
*G05D 1/08* (2006.01)
*G05B 6/02* (2006.01)

(52) U.S. Cl.
CPC ............. *G05D 1/0808* (2013.01); *G05B 6/02* (2013.01); *G05D 1/0825* (2013.01); *G05D 1/0875* (2013.01); *G05D 1/0891* (2013.01)

(58) Field of Classification Search
CPC .. G05D 1/0808; G05D 1/0875; G05D 1/0825; G05D 1/0891; G05B 6/02
See application file for complete search history.

(56) References Cited

U.S. PATENT DOCUMENTS

| | | |
|---|---|---|
| 5,136,507 A | 8/1992 | Shiraishi et al. |
| 5,652,379 A | 7/1997 | Fukatani |
| 8,086,383 B2 | 12/2011 | Takenaka et al. |
| 8,340,841 B2 | 12/2012 | Chiesa |
| 8,447,443 B1 | 5/2013 | Ryan et al. |
| 9,656,593 B2 | 5/2017 | Wise et al. |
| 2009/0171634 A1 | 7/2009 | Bensch et al. |
| 2009/0299494 A1 | 12/2009 | Kahn |
| 2012/0265367 A1 | 10/2012 | Yucelen et al. |

(Continued)

OTHER PUBLICATIONS

European Patent Office, "European Search Report," issued in connection with application No. 18162884.3, dated Jul. 20, 2018, 10 pages.

(Continued)

*Primary Examiner* — Michael J Zanelli
(74) *Attorney, Agent, or Firm* — Hanley, Flight & Zimmerman, LLC

(57) ABSTRACT

Methods, apparatus, and articles of manufacture to perform observer based control of a vehicle are disclosed. An example apparatus includes an error module to calculate a difference between a first state of a vehicle and a second state of the vehicle, the second state based on a measurement from a sensor, an observer module to determine a third state of the vehicle based on the difference, a baseline control module to generate a first command based on the third state, and a vehicle module to execute the first command to control the vehicle.

21 Claims, 7 Drawing Sheets

(56) References Cited

U.S. PATENT DOCUMENTS

2018/0275682 A1   9/2018   Lavretsky et al.

OTHER PUBLICATIONS

Qu et al., "Squaring-Up Method in the Presence of Transmission Zeros," The International Federation of Automatic Control, Cape Town, South Africa, Aug. 24-29, 2014, 6 pages.

Eugene Lavretsky, "Adaptive Output Feedback Design Using Asymptotic Properties of LQG/LTR Controllers," IEEE Transactions on Automatic Control, vol. 57, No. 6, Jun. 2012, 5 pages.

Eugene Lavretsky, "Robust and Adaptive Control Methods for Aerial Vehicles," The Boeing Company, Handbook of Unmanned Aerial Vehicles, Springer Science+Business Media Dordrecht 2015, 36 pages.

Gibson, Travis E., et al., "Adaptive Output Feedback based on Closed-Loop Reference Models," IEEE Transactions on Automatic Control, vol. 60 (10), pp. 2728-2733, Oct. 2015, 8 pages.

Wiese, Daniel P., et al., "Adaptive Output Feedback Based on Closed-Loop Reference Models for Hypersonic Vehicles," Journal of Guidance, Control, and Dynamics, vol. 38 (12), pp. 8-12, 2015, 36 pages.

Lavretsky, Eugene, "Transients in output feedback adaptive systems with observer-like reference models," Int. J. Adapt. Control Signal Process., pp. 1515-1125, vol. 29, DOI: 10.1002/acs.2557, 2015, 11 pages.

Gibson, Travis E., et al., "On Adaptive Control with Closed-Loop Reference Models: Transients, Oscillations, and Peaking", IEEE Access, 10.1109/ACCESS.2013.2284005, vol. 1, pp. 703-717, Sep. 2013, 15 pages.

Non-Final Office Action issued by the United States Patent and Trademark Office in relation to U.S. Appl. No. 15/465,066, dated Apr. 30, 2018, 13 pages.

Notice of Allowance issued by the United States Patent and Trademark Office in relation to U.S. Appl. No. 15/465,066, dated Oct. 3, 2018, 6 pages.

European Patent Office, "Examination Report," dated Jun. 13, 2019 in connection with European Patent Application No. 18162884.3 (6 pages).

European Patent Office, "Communication pursuant to Article 94(3) EPC", issued in connection with European Application No. 18162884.3, dated May 7, 2020, (6 pages).

METHODS AND APPARATUS TO PERFORM OBSERVER-BASED CONTROL OF A VEHICLE

This patent arises from a continuation of U.S. patent application Ser. No. 15/465,066, know U.S. Pat. No. 10,216, 198) which was filed on Mar. 21, 2017. U.S. patent application Ser. No. 15/465,066 is hereby incorporated herein by reference in its entirety. Priority to U.S. patent application Ser. No. 15/465,066 is hereby claimed.

FIELD OF THE DISCLOSURE

This disclosure relates generally to vehicles and, more particularly, to methods and apparatus to perform observer-based control of a vehicle.

BACKGROUND

In recent years, vehicle control systems, like those used in aircraft, automotive, and marine vehicles, have grown progressively more complex with the proliferation of newer and more powerful controllers. The vehicle control systems include one or more controllers capable of implementing a greater number of complex algorithms for measuring and/or controlling different aspects of a vehicle. Control systems continue to incorporate applications of advanced control theory that previously were not feasible to implement due to SW/HW limitations. In addition, the applications of the control theory continue to be modified for adaptation on newer processor architectures.

Vehicle control systems include implementations of control theory based on whether a state of the vehicle is known. In some examples, the state of the vehicle is known (measured), which enables the vehicle control system to generate a control command based on a known state of the vehicle. However, in some instances, the state of the vehicle is partially known or completely unknown. In this case, only output measurements from the vehicle sensors (such as IMU and rate gyros) are available to synthesize a control policy. An unknown state of the vehicle presents additional challenges to the vehicle control system such as, for example, generating a control command based on an estimation of the state of the vehicle. The estimation of the state of the vehicle requires additional processing power to perform complex algorithmic calculations based on advanced control theory techniques. Algorithms that rely on estimation of the vehicle state based on a suite of sensors are called "the observer-based control".

SUMMARY

An example apparatus disclosed herein includes an error module to calculate a difference between a first state of a vehicle and a second state of the vehicle, the second state based on a measurement from a sensor, an observer module to determine a third state of the vehicle based on the difference, a baseline control module to generate a first command based on the third state, and a vehicle module to execute the first command to control the vehicle.

An example method disclosed herein includes calculating a difference between a first state of a vehicle and a second state of the vehicle, the second state based on a measurement from a sensor, determining a third state of the vehicle based on the difference, generating a first command based on the third state, and executing the first command to control the vehicle.

An example tangible computer-readable storage medium includes instructions, which when executed, cause a machine to at least calculate a difference between a first state of a vehicle and a second state of the vehicle, the second state based on a measurement from a sensor, determine a third state of the vehicle based on the difference, generate a first command based on the third state, and execute the first command to control the vehicle.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
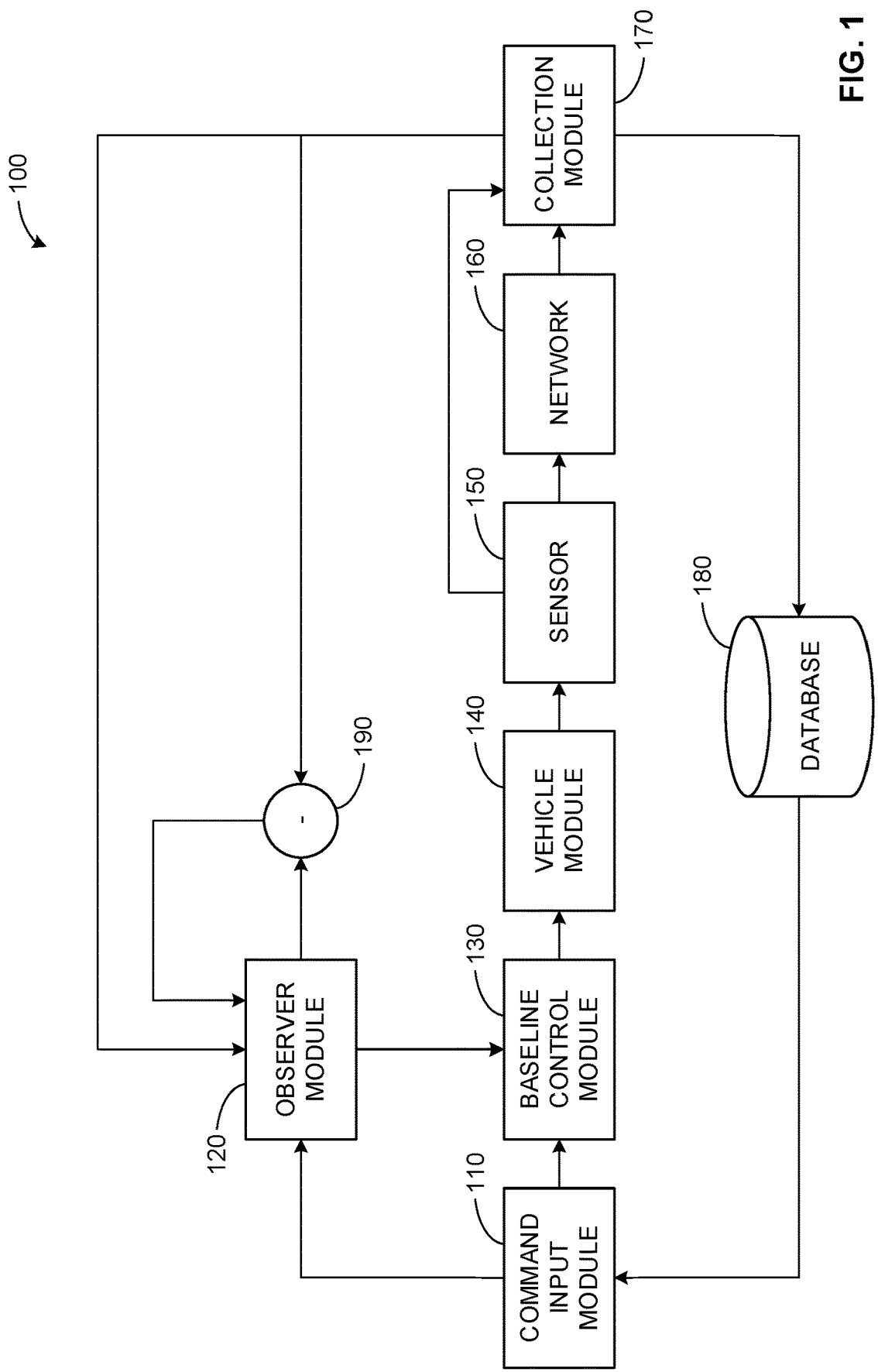
FIG. 1 is a block diagram of an example implementation of an example vehicle control apparatus.

In recent years, vehicle manufacturers have invested in vehicle control system designs to improve accuracy and robustness. The vehicle control system designs include implementations of control theory based on whether a state of a vehicle parameter is known. In some examples, the state of the vehicle parameter is known, which enables the vehicle control system to generate a control command based on a known state of the vehicle parameter. As used herein, the term "vehicle" may refer to air-based (e.g., aircraft), land-based (e.g., automotive, buses, trains, etc.), and/or marine equipment (e.g., boats, submarines, etc.). For example, an aircraft parameter may include an angle of attack, a pitch rate, a first flex mode position, a second flex mode position, a first flex mode velocity, a second flex mode velocity, etc. A state of the aircraft parameter may include a value based on a measurement from a sensor. For example, a state for an aircraft may be measured based on an acceleration sensor (e.g., an accelerometer), an angle of attack sensor, an angular rate sensor (e.g., a gyro sensor), etc.

The vehicle control systems that generate commands based on known states of vehicle parameters may utilize state-space representations to develop mathematical models of a physical system (e.g., an actuator, a vehicle, etc.). The state-space representation may include a set of input, output, and state variables related by first-order ordinary differential equations. For example, a representation of a continuous time-variant system that includes m inputs, p outputs, and n state variables may be described in accordance with Equation (1) and Equation (2) below:

$$\dot{x}(t) = A(t)x(t) + B(t)u(t) \qquad \text{Equation (1)}$$

$$y(t) = C(t)x(t) + D(t)u(t) \qquad \text{Equation (2)}$$

In the illustrated example of Equation (1) above, the variable $\hat{x}\_dot(t)$ represents the vehicle state derivative vector, the variable A(t) represents a state matrix or a system matrix, where a dimension of A(t) is denoted by dim[A(t)]=n×n, and the variable x(t) represents a state vector, where $x(t) \in R^n$. The term $R^n$ represents a Euclidean n-dimensional space. In the illustrated example of Equation (1) above, the variable B(t) represents an input matrix where a dimension of B(t) is denoted by dim[B(t)]=n×m, and the variable u(t) represents an input vector or a control vector, where $u(t) \in R^m$. In the illustrated example of Equation (2) above, the variable y(t) represents an output vector, where $y(t) \in R^p$, the variable C(t) represents an output matrix, where a dimension of C(t) is denoted by dim[C(t)]=p×n, and the variable x(t) represents the state vector, where $x(t) \in R^n$. In the illustrated example of Equation (2) above, the variable D(t) represents a control-feedthrough matrix (i.e., a feedforward matrix) where a dimension of D(t) is denoted by dim[D(t)]=p×m, and the variable u(t) represents the input vector or the control vector, where $u(t) \in R^m$.

Controllability is a property of the vehicle control system. The controllability of a system may denote an ability to move a system around the entire configuration space of the system using only specified admissible manipulations. An example variation of controllability is state controllability. State controllability may be a condition that implies a plausibility to move a state of a parameter and/or a state of a system from any initial value to any final value within a finite time window. For example, a continuous time-invariant linear state-space model is controllable if and only if rank[B AB A² B . . . A$^{n-1}$B]=n, where rank is a number of linearly independent rows in a matrix, and where n is a number of state variables, the variable A is the state matrix, and the variable B is the input matrix.

Observability is another property of the vehicle control system. The observability of a system may be a measure for how well one or more internal states of a system can be inferred by knowing one or more external outputs of the system. The controllability and the observability of the system are mathematical duals. For example, the controllability of the system may denote that an input can bring any initial state to any final state, whereas the observability may denote that knowing an output of the system provides sufficient information to predict an initial state of the system.

In some examples, the state of the vehicle is unknown. An unknown state of the vehicle presents additional challenges to the vehicle control systems such as, for example, generating the control command based on an estimation of the state of the vehicle. The estimation of the state of the vehicle requires additional processing power to perform complex algorithmic calculations based on advanced control theory techniques. For example, to compensate for the unknown state (e.g., no a priori information regarding the state is known), a controller may implement state observers. The controller may also use adaptive control to generate one or more control laws to compensate for unknown parameters.

In some instances, the vehicle control system utilizes a state observer to determine an estimate of an unknown state of the vehicle and/or an unknown state of a parameter of the vehicle. The observer may calculate the estimate of the unknown state based on a measurement from a suite of sensors. The observer may obtain measurements related to an input and an output of the vehicle. For example, the observer may obtain an initial command for an input to an aircraft control system (e.g., a guidance command). In another example, the observer may obtain an output measurement from the vehicle sensors (e.g., accelerometers, rate gyros, etc.). For example, a representation of an observer model for a continuous time-variant linear system for the vehicle that includes m inputs, p outputs, and n state variables may be described in accordance with Equation (3) and Equation (4) below:

$$\dot{\hat{x}}(t) = A(t)\hat{x}(t) + B(t)u(t) + L(y(t) - \hat{y}(t)) \qquad \text{Equation (3)}$$

$$\hat{y}(t) = C(t)\hat{x}(t) + D(t)u(t) \qquad \text{Equation (4)}$$

In the illustrated example of Equation (3) above, the variable $\dot{\hat{x}}(t)$ represents an estimate of the observer state derivative vector, the variable A(t) represents a state matrix or a system matrix, where a dimension of A(t) is denoted by dim[A(t)]=n×n, and the variable $\hat{x}(t)$ represents an estimate of a state vector, where $\hat{x}(t) \in R^n$. The term $R^n$ represents a Euclidean n-dimensional space. In the illustrated example of Equation (3) above, the variable B(t) represents an input matrix, where a dimension of B(t) is denoted by dim[B(t)]=n×m, and the variable u(t) represents an input vector or a control vector, where $u(t) \in R^m$. In the illustrated example of Equation (3) above, the variable L represents an observer error feedback gain, the variable y(t) represents the measurement or output vector, where $y(t) \in R^p$, and the variable $\hat{y}(t)$ represents an estimate of an output vector. The variable L may be represented and parameterized as $L_v$, where v represents a small positive constant, which in turn represents the observer model design parameter and/or the observer model tuning parameter (e.g., the parameter that may be adjusted to affect a behavior of the system).

In the illustrated example of Equation (4) above, the variable $\hat{y}(t)$ represents the estimate of the output vector, the variable C(t) represents an output matrix, where a dimension of C(t) is denoted by dim[C(t)]=p×n, and the variable $\hat{x}(t)$ represents the estimate of the state vector, where $\hat{x}(t) \in R^n$. In the illustrated example of Equation (4) above, the variable D(t) represents a feedthrough matrix (i.e., a feedforward matrix) where a dimension of D(t) is denoted by dim[D(t)]=p×m, and the variable u(t) represents the control vector or the input vector, where $u(t) \in R^m$. In some examples, the estimate of the state vector from Equation (3) is used to form the control feedback input u(t) applied to a plant (e.g., a mathematical representation of a physical system) through a gains matrix K as described in accordance with Equation (5) below:

$$u(t) = -K\hat{x}(t) \qquad \text{Equation (5)}$$

Inserting Equation (5) above into Equation (3) and Equation (4) above may result in an observer model described in accordance with Equation (6) and Equation (7) below:

$$\dot{\hat{x}}(t) = (A(t) - B(t)K)\hat{x}(t) + L(y(t) - \hat{y}(t)) \qquad \text{Equation (6)}$$

$$\hat{y}(t) = (C(t) - D(t)K)\hat{x}(t) \qquad \text{Equation (7)}$$

Due to the separation principle, the variables K and L may be chosen independently without disrupting the overall stability of the observer model. Effectively, the variables K and L are design variables that may be adjusted to improve performance of the observer model and that of the system.

Example vehicle control apparatus disclosed herein are operative to perform observer-based control of a vehicle. The example vehicle control apparatus may be used to generate commands to control the vehicle. The example vehicle control apparatus may generate or obtain a first command and modify the first command based on a state of the vehicle and/or a state of a parameter of the vehicle. For example, the vehicle control apparatus may determine an adjustment to the first command based on a difference between a first vehicle state (e.g., an initial state) and a second vehicle state (e.g., a desired state, a predicted state, etc.). The vehicle control apparatus may calculate an estimate of a state for a parameter (e.g., a predicted output) in response to the vehicle executing the adjustment to the first command. The example vehicle control apparatus may determine a second command based on the adjustment to the first command. The example vehicle control apparatus may transmit the second command to a servomechanism (e.g., a heterostat) to execute the second command. The example vehicle control apparatus may obtain a measurement from a sensor to determine a system output of the vehicle. For example, the vehicle control apparatus for an aircraft may obtain an angular velocity measurement from a gyro sensor to estimate a state of an angle of attack parameter for the aircraft based on executing a command (e.g., an adjusted command).

Some disclosed example vehicle control apparatus calculate a difference between the system output (e.g., the state of the vehicle parameter based on the measurement from the sensor) and the predicted output (e.g., the estimate of the state of the vehicle parameter). For example, the vehicle control apparatus for an aircraft may determine a difference (e.g., an estimation error) between an estimate of a state for a vertical acceleration parameter for the aircraft and a measured state for the vertical acceleration parameter for the aircraft. The vehicle control apparatus may generate a third command based on the measurement from the sensor. The example vehicle control apparatus may determine an adjustment to the third command based on the third command, the sensor measurement, and/or the estimation error. The example vehicle control apparatus may determine a fourth command based on the adjustment to the third command. The example vehicle control apparatus may transmit the fourth command to the servomechanism to execute the fourth command.

Some disclosed example vehicle control apparatus calculate an unknown state of a vehicle parameter and/or an unknown state of the vehicle based on a measurement from a sensor. For example, an aircraft may utilize one or more accelerometers to measure an acceleration of the aircraft and/or may utilize one or more angular rate sensors (e.g., gyro sensors) to measure angular velocity. The example vehicle control apparatus may utilize measurements from the accelerometers and/or the gyro sensors to calculate a state of a parameter such as, for example, an angle of attack parameter, a pitch angle parameter, a pitch rate parameter, a sideslip parameter, etc. For example, the aircraft control system may estimate a value for the state of the angle of attack parameter for the aircraft based on the measurement(s) from the accelerometers, the gyro sensors, etc. as opposed to determining the value for the state of the angle of attack parameter for the aircraft based on a measurement from an angle of attack sensor.

The example vehicle control apparatus described herein may include sub-modules to perform functions related to the control of the vehicle. The sub-modules may be responsible for individual tasks such as, for example, obtaining information (e.g., network information, sensor information, etc.), generating a guidance command, determining a state of a parameter of the vehicle and/or the state of the vehicle, etc. The sub-modules may be responsible for determining an estimate of a state of a parameter of the vehicle and/or an estimate of a state of the vehicle based on an execution of a command. In some examples, the sub-modules are responsible for generating one or more control laws and calculate adjustments to a generated command. In some instances, the sub-modules are responsible for transmitting an adjusted generated command to a servomechanism to execute the adjusted generated command.

FIG. 1 is a block diagram of an example implementation of an example vehicle control apparatus 100. The example vehicle control apparatus 100 controls a vehicle with a generated command based on a measurement from a sensor. The example vehicle control apparatus 100 includes an example command input module 110, an example observer module 120, an example baseline control module 130, an example vehicle module 140, an example sensor 150, an example network 160, an example collection module 170, an example database 180, and an example error module 190.

In the illustrated example of FIG. 1, the vehicle control apparatus 100 includes the command input module 110 to obtain or generate a command to control a vehicle. In some examples, the command input module 110 generates the command based on user input. For example, a pilot of an aircraft may perform an action (e.g., maneuvering a joystick, pressing a button, annunciating a voice command, etc.) that the command input module 110 translates into the command to the baseline control module 130 and to the observer module 120. In some instances, the command input module 110 generates the command based on a measurement from a sensor. For example, the command input module 110 may represent a guidance module (e.g., a guidance module of an unmanned aircraft) that generates the command for the baseline control module 130 to calculate the corresponding output and to move a control surface of the aircraft based on a measurement from an accelerometer, a gyro sensor, etc. In some examples, the command input module 110 generates the command based on information obtained from the database 180. For example, the command input module 110 may generate the command based on a look-up table that includes commands based on the measurement from the sensor (e.g., the accelerometer, the gyro sensor, etc.). For example, the command input module 110 may determine the measurement from the sensor and query the look-up table in the database 180 for the command corresponding to the measurement from the sensor.

In some examples, the command input module 110 determines a difference between a command (e.g., a guidance command) and a measurement from a sensor. For example, the command input module 110 may determine a first value (e.g., an initial command, an initial state of a parameter, an initial state of the vehicle, etc.). For example, the first value may be a guidance command r. The command input module 110 may determine a second value (e.g., a value obtained from the database 180). For example, the second value may be a measurement y or $y_{meas}$ from the database 180. The command input module 110 may determine a difference between the first value and the second value. For example, the command input module 110 may determine a difference between the command and the measurement to determine an error value of −e (e.g., r−y=−e). In some examples, the command input module 110 transmits the error value to the baseline control module 130.

In the illustrated example of FIG. 1, the vehicle control apparatus 100 includes the observer module 120 to determine a state of the vehicle and/or a state of a parameter of the vehicle. In some examples, the observer module 120 utilizes an observer model. The observer model may be a mathematical representation of the vehicle that provides an estimate of one or more internal states of the vehicle. The observer model may determine the estimate of the one or more internal states of the vehicle based on a measurement of one or more inputs (e.g., commands) and/or outputs (e.g., sensors) of the vehicle.

In some examples, the observer module 120 determines a state of a vehicle parameter based on a measurement from a sensor. For example, the observer module 120 may determine a state of an angle of attack parameter of an aircraft based on a measurement from an angle of attack sensor. In some instances, the observer module 120 determines an estimate of the state of the vehicle parameter. For example, the observer module 120 may determine an estimate of the state of the angle of attack parameter of the aircraft based on a measurement from a gyro sensor, a value from the database 180 (e.g., a sensor measurement, a value of a vehicle parameter state, etc.), etc. The observer module 120 may obtain the measurement from the sensor from the collection module 170.

In some examples, the observer module 120 determines an estimate for a state of a parameter of the vehicle based on the vehicle executing a command. For example, the observer module 120 may determine the state of a vehicle parameter before executing the command and calculate an estimate of the state of the vehicle parameter in response to executing the command. For example, the observer module 120 may determine a first value (e.g., an initial value) of a state of an angle of attack parameter of an aircraft. The observer module 120 may calculate a second value (e.g., an estimate value) of the state of the angle of attack parameter of the aircraft based on the aircraft executing the command. The observer module 120 may calculate a first difference between the first value and the second value.

In some examples, the observer module 120 compares the first difference to an error estimation value calculated external to the observer module 120 (e.g., calculated by the error module 190) to improve the observer module 120 state estimating functions. For example, the error estimation may be calculated based on a second difference between (1) the value of the state of the angle of attack parameter based on the measurement from the sensor and (2) the estimate value of the state of the angle of attack parameter calculated by the observer module 120. In some instances, the observer module 120 transmits the estimate value of the state of the vehicle parameter to the error module 190. In some examples, the observer module 120 determines whether the first difference and/or the second difference satisfies a threshold. For example, the observer module 120 may determine that the first difference does not satisfy a threshold (e.g., the first difference is less than 5 degrees). In another example, the observer module 120 may determine that the second difference satisfies the threshold (e.g., the second difference is greater than 5 degrees).

In some examples, the observer module 120 determines an estimate of a state of the vehicle and/or an estimate of a state of a parameter of the vehicle based on an obtained command. For example, the observer module 120 may determine an estimate of a state of a sideslip parameter of an aircraft based on a command obtained from the command input module 110. The observer module 120 may determine the estimate of the state based on the command obtained from the command input module 110, the measurement from the sensor (e.g., the angle of attack sensor, the accelerometer, the gyro sensor, etc.), the error estimation obtained by the observer module 120, etc. For example, the observer module 120 may determine a first value (e.g., an initial value) for a state of a vehicle parameter. The observer module 120 may additionally determine a second value (e.g., an estimate value) for the state of the vehicle parameter based on the vehicle executing the command obtained from the command input module 110. The observer module 120 may also determine a third value (e.g., an updated estimate of the state of the vehicle parameter) based on the difference between the first value and the second value. In some examples, the observer module 120 transmits the third value (e.g., the updated estimate of the state of the vehicle parameter) to the baseline control module 130.

In some instances, the observer module 120 performs a squaring-up modification to an input matrix and/or an output matrix of the observer model utilized by the observer module 120. In some examples, the observer module 120 adds a pseudo-output matrix to the output matrix of the observer model. In some instances, the observer module 120 adds a pseudo-input matrix to the input matrix of the observer model. For example, the observer module 120 may add the pseudo-input matrix, which includes fictitious inputs (i.e., inputs that do not represent physical inputs to the vehicle), to the input matrix of the observer model to make a number of inputs (e.g., controls) in the input matrix equal a number of outputs (e.g., measurements) in the output matrix. The observer module 120 makes the observer model used by the observer module 120 minimum phase (i.e., the vehicle transmission zeros are located in $C^-$) by performing the squaring-up modification. During the squaring-up modification, the observer module 120 may place one or more zeros (e.g., transmission zeros) in a desired location utilizing a linear quadratic regulator (LQR) and/or a pole-placement algorithm. The observer module 120 may perform the squaring-up modification to satisfy one or more sufficient conditions. A first sufficient condition may be a relationship of p=m, where p represents a number of outputs and m represents a number of inputs. For example, the first sufficient condition may represent square dynamics of the observer model used by the observer module 120. A second sufficient condition may be a relationship of det(CB)≠0, where a determinant of an output matrix C and an input matrix B does not equal zero. For example, the second sufficient condition may represent a relative degree of one. A third sufficient condition may be a relationship of det $$\begin{pmatrix} sI - A & B \\ C & 0 \end{pmatrix} = 0$$

where $s \in C^-$. For example, the third sufficient condition may include a determinant of a matrix including the input matrix B, the output matrix C, and a transfer function sI−A, where the determinant of the matrix equals zero, and where all zeros (e.g., transmission zeros) are in the open left half of the complex plane of the output matrix C (excluding the jw-axis). For example, the third sufficient condition may represent that the observer module 120 uses the observer model that includes one or more transmission zeros which are stable. In another example, the third sufficient condition may represent that the observer module 120 uses the observer model representing a system which is minimum phase.

In some examples, the observer module 120 performs the squaring-up modification by converting a tall system to a square system. For example, a tall, controllable, observable, and minimum-phase system with full rank $C_{meas}*B$ may be squared-up to satisfy the first, second, and third example sufficient conditions as described above, where the variable $C_{meas}$ represents the output matrix $$\begin{pmatrix} I_{m \times m} & 0 \\ 0 & C_{p \, meas} \end{pmatrix}.$$

An example tall system is described in Equation (8) below:

$$\begin{pmatrix} A & B \\ C_{meas} & 0_{p \times m} \end{pmatrix} \in R^{(n+p) \times (n+m)} \quad \text{Equation (8)}$$

In the illustrated example of Equation (8) above, the variables A and B represent m-Inputs, the variables $C_{meas}$ and $0_{p \times m}$ represent p-Outputs, and the variable n represents the number of states. The observer module 120 may convert the example tall system described above in Equation (8) into an example square system as described in Equation (9) below:

$$\begin{pmatrix} A & (B, B_2) \\ C_{meas} & 0_{p \times p} \end{pmatrix} \in R^{(n+p) \times (n+p)} \quad \text{Equation (9)}$$

In the illustrated example of Equation (9) above, the variables A and (B, B₂) represent p-Inputs, the variables $C_{meas}$ and $0_{p \times p}$ represent p-Outputs, and the variable n represents the number of states. As described in Equation (9) above, the observer module 120 may add one or more fictitious inputs to the input matrix of B to yield a second input matrix (B, B₂), where B₂ is a pseudo-input matrix. The observer module 120 may replace the input matrix of B with the second input matrix (B, B₂) in the first, second, and third example sufficient conditions as described above. The observer module 120 may satisfy the first, second, and third example sufficient conditions due to the following revised relationships $$\overline{B} = (B, B_2) \to \det(C_{meas}\overline{B}) \neq 0 \wedge \left( \det \begin{pmatrix} sI - A & \overline{B} \\ C_{meas} & 0 \end{pmatrix} = 0, \to s \in C^- \right),$$

where the revised relationships are determined by at least Equation (9) above. For example, the revised relationships may represent that the pseudo-input matrix B₂ generated during the squaring-up modification satisfies the first, second, and third example sufficient conditions as described above. As a result, the observer module 120 may utilize the input matrix $\overline{B}$ in the observer model to perform observer-based control of the vehicle.

In some instances, the observer module 120 determines one or more symmetric, positive, definite, and parameter-dependent weight matrices for the observer model. For example, the observer module 120 may assign $Q_0 \in R^{n \times n}$ and $R_0 \in R^{m \times m}$ to be symmetric and positive definite, where $R^{n \times n}$ denotes the space of all n×n matrices, and where $R^{m \times m}$ denotes the space of all m×m matrices. The observer module 120 may determine one or more constants within $R^{n \times n}$ and/or $R^{m \times m}$. For example, the observer module 120 may determine a value for constants v and/or η, where v>0 and η>0. The observer module 120 may determine two symmetric, positive, definite, and parameter-dependent weight matrices as described in Equation (10) and Equation (11) below:

$$Q_v = Q_0 + \left(\frac{v+1}{v}\right)\overline{B}\,\overline{B}^T \quad \text{Equation (10)}$$

$$R_v = \frac{v}{v+1}R_0 \quad \text{Equation (11)}$$

The observer module 120 may use the constants v and/or η, Equation (10) above and/or Equation (11) above to evaluate a parameter-dependent Algebraic Riccati Equation (ARE) as described in Equation (12) below:

$$P_v(A+\eta I_{n \times n})^T + (A+\eta I_{n \times n})P_v - P_v C_{meas}^T R_v^{-1} C_{meas} P_v + Q_v = 0 \quad \text{Equation (12)}$$

In the illustrated example of Equation (12) above, the variable $P_v$ represents the unique, symmetric, positive, and definite solution for any positive value of the constants v and η. In the illustrated example of Equation (12) above, the variable A represents the observer matrix included in the observer model utilized by the observer module 120, and the variable $I_{n \times n}$ represents an identity matrix of size n×n. In some examples, the observer module 120 evaluates the asymptotic behavior of $P_v$ as v→0 while holding η fixed. For example, the observer module 120 may use the asymptotic expansion as described below in Equation (13) to determine one or more asymptotic relations as described in Equation (14), Equation (15), and Equation (16) below as described below where the variable O represents Bachmann-Landau asymptotic order notation:

$$P_v = P_0 + P_1 v + O(v^2) \quad \text{Equation (13)}$$

$$P_v = P_0 + O(v) \quad \text{Equation (14)}$$

$$P_v^{-1} = P_0^{-1} + O(v) \quad \text{Equation (15)}$$

$$P_v^{-1}\overline{B} = C_{meas}^T R_0^{-1/2} W + O(v) \quad \text{Equation (16)}$$

In some examples, the observer module 120 evaluates the asymptotic expansion described above in Equation (13) to determine the asymptotic relations as described above in Equation (14), Equation (15), and Equation (16) as v→0, with a constant, symmetric, positive, and definite matrix $P_0$. In some instances, the observer module 120 evaluates Equation (16) above by applying a relationship of $W = (UV)^T$, where the two unitary matrices, U and V, are defined by the singular value decomposition as described in Equation (17) below:

$$\overline{B}^T C_{meas}^T R_0^{-1/2} = U\Sigma V \quad \text{Equation (17)}$$

In the illustrated example of Equation (17) above, the symbol Σ represents the diagonal matrix of the corresponding singular values. In some instances, the illustrated examples described above in Equation (16) and Equation (17) guarantee strict positive definiteness of $P_v$ and $P_v^{-1}$ uniformly in v. The observer module 120 may utilize one or more of the above described equations to determine the observer gain $L_v$ as described in Equation (18) below:

$$L_v = P_v C_{meas}^T R_v^{-1} \quad \text{Equation (18)}$$

In the illustrated example of Equation (18) above, the variable $P_v$ represents the unique solution described above in Equation (12), where $P_v = P_v^T > 0$. The observer module 120 may utilize the relationship described above in Equation (18) to determine the closed-loop observer dynamics of the observer model of a system (e.g., a vehicle) as described in Equation (19) and Equation (20) below:

$$\dot{\hat{x}} = A\hat{x} + Bu_{bl} + B_{cmd}y_{cmd} + L_v(y_{meas} - \hat{y}_{meas}) \quad \text{Equation (19)}$$

$$\hat{y}_{meas} = C_{meas}\hat{x} \quad \text{Equation (20)}$$

In the illustrated example of Equation (19) above, the variable $\dot{\hat{x}}$ represents an estimate of an observer state derivative vector, the variable A represents a state matrix, and the variable $\hat{x}$ represents an estimate of a state vector. Further, in the illustrated example of Equation (19) above, the variable B represents an input matrix, the variable $B_{cmd}$ represents an input command matrix, and the variable $y_{cmd}$ represents an output command vector. In the illustrated example of Equation (19) above, the variable $L_v$ represents the observer gain, the variable $y_{meas}$ represents a measured output vector (e.g., a measurement from a sensor), and the variable $\hat{y}_{meas}$ represents an estimate of a measured output vector. Additionally, in the illustrated example of Equation (19) above, the variable $u_{bl}$ represents a baseline control input or a baseline control command (e.g., a value generated by the baseline control module 130), where $u_{bl}$ may be described in accordance with Equation (21) below:

$$u_{bl} = -K_{lqr}\hat{x} \qquad \text{Equation (21)}$$

In the illustrated example of Equation (21) above, the variable $K_{lqr}$ represents a constant Linear Quadratic Regulator (LQR) baseline control gain, where $K_{lqr} \in R^{n \times m}$. In the illustrated example of Equation (20) above, the variable $C_{meas}$ represents a measured output matrix. Further, in the illustrated example of Equation (20) above, the measured output vector $\hat{y}_{meas}$ tracks the bounded command $y_{cmd}$ described above in Equation (19) with uniformly bounded errors.

The observer module 120 may determine the variable $K_{lqr}$ such that an observer state matrix $A_{obs}$ described below in Equation (22) becomes Hurwitz (i.e., every eigenvalue of $A_{obs}$ has a strictly negative real part) and has one or more desired modal characteristics:

$$A_{obs} = A - BK_{lqr} - L_v C_{meas} \qquad \text{Equation (22)}$$

The observer module 120 may apply Equation (22) above to Equation (20) above to yield Equation (23) as described below:

$$\dot{\hat{x}} = A_{obs}\hat{x} + B_{cmd}y_{cmd} + L_v y_{meas} \qquad \text{Equation (23)}$$

In some examples, the observer module 120 evaluates the relationship as described above in Equation (23) to recover LQR full state baseline feedback stability margins at the input to the vehicle plant. In some instances, the observer module 120 determines a value of the constant v to be sufficiently small to recover the LQR stability margins at the input to the observer model and/or the vehicle plant.

In the illustrated example of FIG. 1, the vehicle control apparatus 100 includes the baseline control module 130 to generate a control input to control the vehicle. For example, the baseline control module 130 may generate a value for a control input variable u to control a control surface of an aircraft. In some examples, the baseline control module 130 generates the control input based on a guidance command obtained from the command input module 110. In some instances, the baseline control module 130 generates the control input based on an estimate of a state of the vehicle obtained from the observer module 120, and/or an estimate of a state of a vehicle parameter obtained from the observer module 120.

In some examples, the baseline control module 130 includes integral error control mechanisms such as, for example, an integral controller transfer function representative of a servomechanism. The baseline control module 130 may obtain a guidance command r and/or an error value −e from the command input module 110. The baseline control module 130 may utilize an integral controller transfer function $K_i/s$ to generate a baseline command utilized to generate the control input u. For example, the baseline control module 130 may apply the integral controller transfer function to the obtained guidance command to generate the baseline command. In some examples, the baseline control module 130 determines a difference between the baseline state of a vehicle parameter (e.g., the baseline command) and an estimate of a state of the vehicle parameter obtained from the observer module 120 (e.g., a state feedback stability value $K_x$, where x represents the state and/or the estimate of the state) to determine the control input u. The baseline control module 130 may determine the control input u as described in Equation (24) below:

$$u = -K_{lqr}\hat{x} \qquad \text{Equation (24)}$$

In the illustrated example of Equation (24) above, the variable $K_{lqr}$ represents the constant LQR baseline control gain, where $K_{lqr} \in R^{n \times m}$ and the variable $\hat{x}$ represents the estimate of the state vector. The baseline control module 130 may further expand the relationship as described above in Equation (24) by replacing the variable $\hat{x}$ in Equation (25) below:

$$u = -K_{lqr}(sI_{n \times n} - A_{obs})^{-1}(B_{cmd}y_{cmd} + L_v y_{meas}) \qquad \text{Equation (25)}$$

In the illustrated example of Equation (25) above, the term $(sI_{n \times x} - A_{obs})^{-1}$ represents the transfer function of the observer model utilized by the observer module 120. The baseline control module 130 may determine the control input u based on Equation (25) above.

In the illustrated example of FIG. 1, the vehicle control apparatus 100 includes the vehicle module 140 to execute a command of the vehicle. The vehicle module 140 may include a plant (e.g., a system) represented by one or more transfer functions, where the transfer functions are mathematical representations utilized to describe inputs and outputs of the vehicle. The vehicle module 140 includes the plant to combine a process and an actuator. For example, the vehicle module 140 may include the plant to represent a control surface of an aircraft (e.g., an elevator, a flap, a slat, etc.). The plant may include a transfer function to represent an actuator and/or a sensor monitoring the actuator of the aircraft control surface.

In some examples, the vehicle module 140 includes one or more state-space relationships. The vehicle module 140 may obtain the control input (e.g., the control input u) from the baseline control module 130. The vehicle module 140 may achieve bounded command tracking in the vehicle. For example, the vehicle module 140 may evaluate the one or more state-space relationships using the control input u to determine a regulated output $y_{reg}$ to follow the external bounded time-varying command $y_{cmd}$. The vehicle module 140 may be represented by the state-space relationships as described below in Equation (26), Equation (27), and Equation (28):

$$\dot{x} = Ax + B\Lambda(u + \Theta^T \Phi(x)) + B_{ref}y_{cmd} \qquad \text{Equation (26)}$$

$$y = Cx \qquad \text{Equation (27)}$$

$$y_{reg} = C_{reg}x \qquad \text{Equation (28)}$$

In the illustrated example of Equation (26) above, the state matrix A, the input matrix B, and the reference input matrix $B_{ref}$ are known matrices, where $A \in R^{n \times n}$, $(B, B_{ref}) \in R^{n \times m}$. In some examples, (A, B) is controllable and rank B=m (i.e., B has full column rank). In some instances, (A, C) is observable and rank C=p (i.e., C has full row rank). In some examples, the number of outputs (e.g., measured outputs) is greater than the number of inputs (e.g., control inputs) (i.e., p>m) where rank (CB)=m. In the illustrated example of Equation (26) above, the system state is x∈R$^n$, and the control input is u∈R$^m$. Further, in the illustrated example of Equation (26) above, the variable Λ is a constant unknown non-singular positive diagonal matrix representing the system uncertainties where Λ∈R$^{m×m}$. Additionally, in the illustrated example of Equation (26) above, the variable Θ is a constant unknown matrix where Θ∈R$^{n×m}$, and the variable Φ represents a known regressor vector where Φ∈R$^n$. In some examples, the regressor is globally Lipschitz continuous in x, where there exists a finite positive known constant 0<L$_Φ$<∞, such that the relationship described below in Equation (29) holds true for any $x_1$, $x_2$∈R$^n$:

$$\|\Phi(x_1)-\Phi(x_2)\| \le L_\Phi \|x_1-x_2\| \quad \text{Equation (29)}$$

In the illustrated examples of Equation (27) above and Equation (28) above, the output matrix C and the regulated output matrix $C_{reg}$ are known matrices, where C∈R$^{p×n}$ and $C_{reg}$∈R$^{m×n}$. In the illustrated examples of Equation (27) above and Equation (28) above, the system measurements are grouped into y∈R$^p$, the regulated output is $y_{reg}$∈R$^m$, and $y_{cmd}$∈R$^m$ denotes the external bounded time-varying command for $y_{reg}$ to track. In the illustrated example of Equation (28) above, the regulated output dynamics (e.g., the regulated outputs $y_{reg}$) can be non-minimum phase and have a vector relative degree greater than unity.

In the illustrated example of FIG. 1, the vehicle control apparatus 100 includes the sensor 150 to obtain a measurement of the vehicle. For example, the sensor 150 may measure a state of an output of the vehicle. The output may be a state of a vehicle parameter such as, for example, an angle of attack, a pitch angle, a pitch rate, a first flex mode position, a second flex mode position, a first flex mode velocity, a second flex mode velocity, etc. The output measurement may also be represented as a linear combination of the vehicle states such as vertical acceleration. The sensor 150 may be a sensor such as, for example, an accelerometer, an altimeter, a gyro sensor, a pressure sensor, etc. Additionally or alternatively, the sensor 150 may be any sensor or sensor type operating on an aircraft, land-based, or marine vehicle.

In the illustrated example of FIG. 1, the vehicle control apparatus 100 includes the network 160. The sensor 150 may be in communication with the network 160. The network 160 of the illustrated example of FIG. 1 is a process control network (e.g., an aircraft process control network). However, the example network 160 may be implemented using any suitable wired and/or wireless network(s) including, for example, one or more data buses, one or more aircraft process control networks, one or more Local Area Networks (LANs), one or more wireless LANs, one or more cellular networks, one or more private networks, one or more public networks, etc. The network 160 enables the sensor 150 to be in communication with the collection module 170. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the vehicle control apparatus 100 includes the collection module 170 to query, filter, obtain, process, and/or select a measurement. In some examples, the collection module 170 obtains a measurement from the sensor 150 via the network 160. In some examples, the collection module 170 obtains the measurement from the sensor 150 directly (e.g., without the network 160). The collection module 170 may obtain unprocessed information (e.g., non-manipulated data from a sensor, non-scaled data from a sensor, etc.) or processed information (e.g., manipulated data from a sensor, scaled data from a sensor, etc.). In some examples, the collection module 170 stores sensor information in the database 180.

In some examples, the collection module 170 selects obtained sensor measurements of interest to be used by one or more algorithms, processes, programs, etc. deployed by the vehicle control apparatus 100. For example, the collection module 170 may process a value from a sensor measurement by converting (e.g., converting using a conversion calculation, converting to different units of measure, etc.), scaling (e.g., scaling using a scaling factor), and/or translating (e.g., translating using a pre-determined curve, translating using a pre-determined equation) the value from the sensor measurement for use by the observer module 120 and, more generally, the vehicle control apparatus 100. In some examples, the collection module 170 selects the sensor measurement by querying the database 180. In response to the database 180 receiving the query sent from the collection module 170, the database 180 transmits the sensor measurement to the collection module 170. In some examples, the collection module 170 obtains a query from the observer module 120 and/or the error module 190 for a sensor measurement of interest. In response to the collection module 170 receiving the query, the collection module 170 may transmit the sensor measurement of interest to the observer module 120 and/or the error module 190.

In the illustrated example of FIG. 1, the vehicle control apparatus 100 includes the database 180 to record data (e.g., obtained sensor information, calculated sensor measurement values, etc.). In some examples, the database 180 stores a pre-defined look-up table that includes values for gain parameters. For example, observer module 120 and the baseline control module 130 may query the look-up table to obtain a gain value to be used in one or more calculations. The database 180 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The database 180 may additionally or alternatively be implemented by one or more double data rate (DDR) memories, such as DDR, DDR2, DDR3, mobile DDR (mDDR), etc. The database 180 may additionally or alternatively be implemented by one or more mass storage devices such as hard disk drive(s), compact disk drive(s) digital versatile disk drive(s), magnetic media, etc. While in the example the database 180 is illustrated as a single database, the database 180 may be implemented by any number and/or type(s) of databases.

In the illustrated example of FIG. 1, the vehicle control apparatus 100 includes the error module 190 to determine an error estimation value. The error module 190 may calculate a difference between a measured (true) value of a state of a vehicle parameter and an estimate value of the state of the vehicle parameter. The error module 190 may obtain the measured value from the collection module 170. For example, the error module 190 may identify a first value of a state of a pitch rate of an aircraft, where the first value is measured from a gyro sensor. The error module 190 may identify a second value of the state of the pitch rate of the aircraft, where the second value is an estimate value of the state of the pitch rate obtained from the observer module 120. The error module 190 may determine a difference (e.g., an error estimation value) between the first value and the second value. In response to the error module 190 determining the difference, the error module 190 may transmit the difference to the observer module 120. For example, the error module 190 may transmit the error estimation value to the observer module 120 to improve the state estimating functions of the observer module 120.

While an example manner of implementing the vehicle control apparatus 100 is illustrated in FIG. 1, one or more of the elements, processes, and/or devices illustrated in FIG. 1 may be combined, divided, re-arranged, omitted, eliminated, and/or implemented in any other way. Further, the example command input module 110, the example observer module 120, the example baseline control module 130, the example vehicle module 140, the example sensor 150, the example network 160, the example collection module 170, the example database 180, the example error module 190 and/or, more generally, the example vehicle control apparatus 100 of FIG. 1 may be implemented by hardware, software, firmware and/or any combination of hardware, software and/or firmware. Thus, for example, any of the example command input module 110, the example observer module 120, the example baseline control module 130, the example vehicle module 140, the example sensor 150, the example network 160, the example collection module 170, the example database 180, the example error module 190 and/or, more generally, the example vehicle control apparatus 100 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example command input module 110, the example observer module 120, the example baseline control module 130, the example vehicle module 140, the example sensor 150, the example network 160, the example collection module 170, the example database 180, the example error module 190 and/or, more generally, the example vehicle control apparatus 100 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle control apparatus 100 of FIG. 1 may include one or more elements, processes, and/or devices in addition to, or instead of, those illustrated in FIG. 1, and/or may include more than one of any or all of the illustrated elements, processes, and devices.

Figure 2:
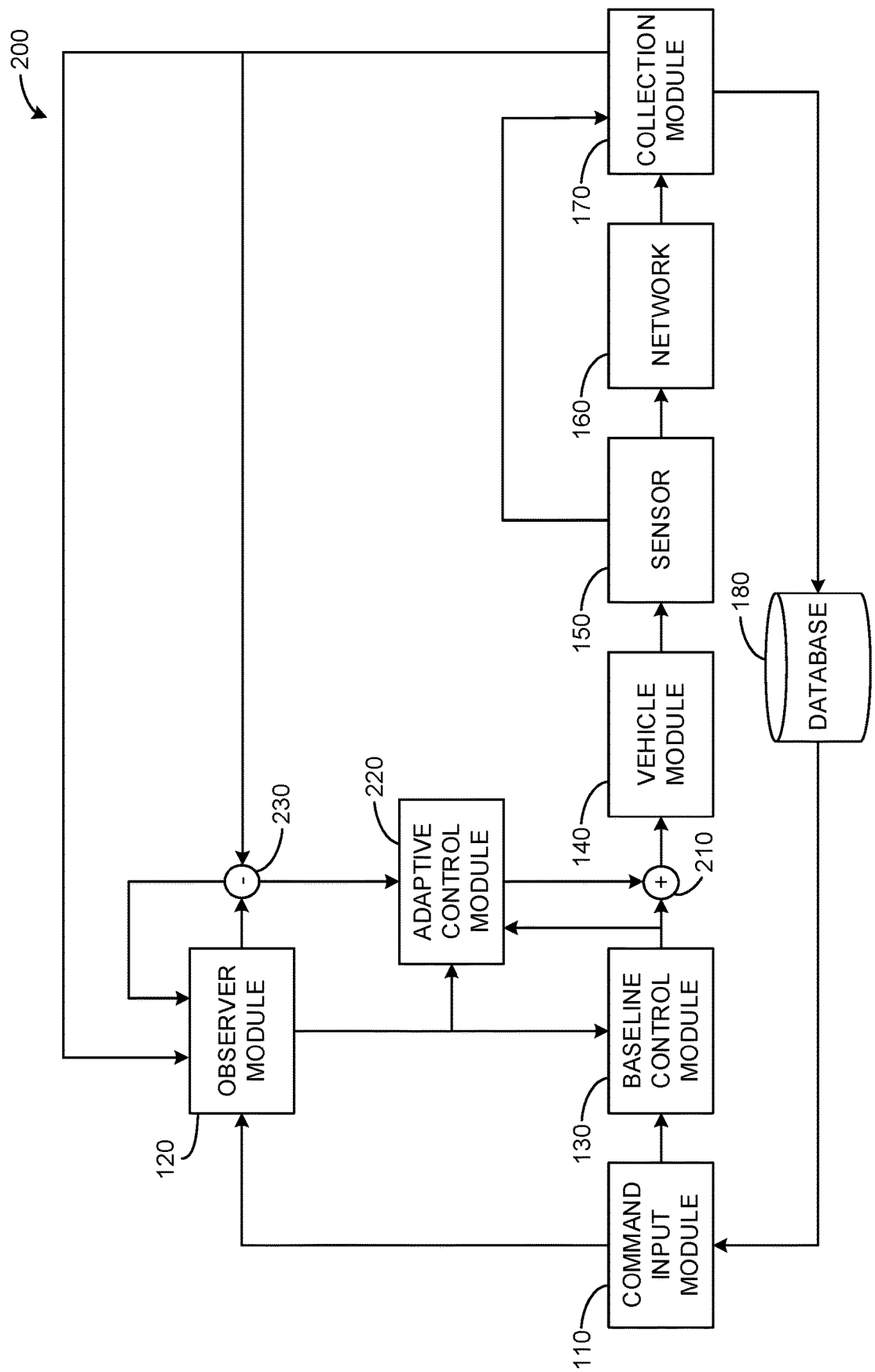
FIG. 2 is a block diagram of an example implementation of an example vehicle control apparatus including an adaptive control module.

FIG. 2 is a block diagram of an example implementation of an example vehicle control apparatus 200. The example vehicle control apparatus 200 controls a vehicle with a generated command based on a measurement from a sensor. The example vehicle control apparatus 200 includes an example adder module 210, an example adaptive control module 220, and an example error module 230. The example vehicle control apparatus 200 further includes the example command input module 110, the example observer module 120, the example baseline control module 130, the example vehicle module 140, the example sensor 150, the example network 160, the example collection module 170, and the example database 180 of FIG. 1. In some examples, the adaptive control module 220 alerts the vehicle control apparatus 200 that the adaptive control module 220 exists in the vehicle control apparatus 200 and/or functions in the vehicle control apparatus 200. For example, the adaptive control module 220 may alert the vehicle control apparatus 200 by modifying a value of a flag. As used herein, the flag is a variable in computer and/or machine readable instructions.

In the illustrated example of FIG. 2, the vehicle control apparatus 200 includes the vehicle module 140 to execute a command of the vehicle. In some examples, the vehicle module 140 executes the command of the vehicle based on the control input (e.g., the control input u) obtained from the adder module 210. In the illustrated example, the control input u may be described in accordance with Equation (30) below:

$$u = u_{bl} + u_{ad} \qquad \text{Equation (30)}$$

In the illustrated example of Equation (30) above, the variable $u_{bl}$ represents the baseline control input and the variable $u_{ad}$ represents an adaptive incremental control or an adaptive control input. For example, the vehicle module 140 may obtain the baseline control input from the baseline control module 130 via the adder module 210. In another example, the vehicle module 140 may obtain the adaptive control input from the adaptive control module 220 via the adder module 210. The vehicle control apparatus 200 includes the adder module 210 to generate the control input based on an addition of the baseline control input the adaptive control input as described above in Equation (30). In response to the adder module 210 generating the control input, the adder module 210 transmits the control input to the vehicle module 140.

In some examples, the vehicle module 140 includes one or more state-space relationships based on the adaptive control input. For example, the vehicle module 140 may evaluate the one or more state-space relationships using the control input u to determine a regulated output $y_{reg}$ to follow the external bounded time-varying command $y_{cmd}$. The vehicle module 140 may be represented by the state-space relationships as described below in Equation (31), Equation (32), and Equation (33):

$$\dot{x} = Ax + Bu_{bl} + B\Lambda(u_{ad} + \Theta^T\Phi(x) + (I_{m \times m} - \Lambda^{-1})u_{bl}) + B_{ref}y_{cmd} \qquad \text{Equation (31)}$$

$$\overline{\Theta}^T = \Theta^T I_{m \times m} - \Theta^{-1} \qquad \text{Equation (32)}$$

$$\overline{\Phi}(x, u_{bl}) = \begin{pmatrix} \Phi(x) \\ u_{bl} \end{pmatrix} \qquad \text{Equation (33)}$$

The vehicle module 140 may apply Equation (32) above and Equation (33) above to Equation (31) above to yield Equation (34) as described below:

$$\dot{x} = Ax + Bu_{bl} + B\Lambda(u_{ad} + \overline{\Theta}^T\overline{\Phi}(x, u_{bl})) + B_{ref}y_{cmd} \qquad \text{Equation (34)}$$

The vehicle module 140 may execute the control input. In response to the vehicle module 140 executing the control input, the vehicle module 140 may determine the state of the vehicle and/or the state of the vehicle parameter based on calculating the observer state vector 2 as described above in Equation (34). In response to the vehicle module 140 obtaining the adaptive control input from the adaptive control module 220, the observer module 120 may update the estimate of the observer state vector relationship to be in accordance with Equation (35) as described below:

$$\dot{\hat{x}} = A\hat{x} + Bu_{bl} + B\hat{\Lambda}(u_{ad} + \overline{\Theta}^T\overline{\Phi}(\hat{x}, u_{bl})) + L_v(y - \hat{y}) + B_{ref}y_{cmd} \qquad \text{Equation (35)}$$

In some examples, the observer module 120 determines an estimate value for the state of the vehicle and/or the state of the parameter of the vehicle using Equation (35) above. For example, the observer module 120 may use Equation (35) above to determine an estimate value for a state of a pitch rate parameter of an aircraft based on the aircraft executing the control input, where the control input actuates an aircraft control surface (e.g., an elevator, a flap, a slat, etc.).

In the illustrated example of FIG. 2, the vehicle control apparatus 200 includes the adaptive control module 220 to perform adaptive control of the vehicle. In some examples, the adaptive control module 220 adapts to the vehicle where one or more parameters of the vehicle vary, or are initially uncertain. For example, the adaptive control module 220 may not require a priori information about the bounds on the uncertain and/or the time-varying parameters of the vehicle to generate a control law and/or generate a command based on the control law. In some examples, the adaptive control module 220 modifies existing control laws based on information from the observer module 120 (e.g., an estimate of a state of a vehicle parameter) and/or information from the error module 230 (e.g., an error estimation value). In some instances, the adaptive control module 220 generates a new control law and/or eliminates an existing control law based on the information from the observer module 120 (e.g., the estimate of the state of the vehicle parameter) and/or the information from the error module 230 (e.g., the error estimation value). In some examples, the adaptive control module 220 generates, modifies, and/or eliminates a control law based on the information from the baseline control module 130 (e.g., the baseline control input).

In some examples, the adaptive control module 220 determines an adaptive control input or adaptive control command to be in accordance with Equation (36) as described below:

$$u_{ad} = -\hat{\Theta}^T \Phi(\hat{x}, u_{bl})$$ Equation (36)

In the illustrated example of Equation (36) above, the variables $\hat{\Theta}$ and $\Phi(\hat{x}, u_{bl})$ represent the extended unknown constant matrix of parameters and the known extended regressor, correspondingly. In some examples, the adaptive control module 220 transmits the adaptive control input $u_{ad}$ to the adder module 230. In response to the adaptive control module 220 determining the adaptive control input as described above in Equation (36), the estimate of the observer state vector relationship utilized by the observer module 120 may be simplified. For example, the observer module 120 may apply Equation (36) above to Equation (35) above to determine the estimate of the observer state vector relationship as described below in Equation (37):

$$\dot{\hat{x}} = A\hat{x} + Bu_{bl} + L_v(y - \hat{y}) + B_{ref} y_{cmd}$$ Equation (37)

In the illustrated example of Equation (37) above, the observer module 120 simplifies the observer dynamics by producing a linear estimate of the observer state vector relationship. In response to the adaptive control module 220 determining the adaptive control input as described above in Equation (36), the baseline control module 130 may determine the baseline control input to be in accordance with Equation (38) as described below:

$$u_{bl} = -K_{bl}^T \hat{x}$$ Equation (38)

In the illustrated example of Equation (38) above, the baseline control module 130 may determine the constant gain $K_{bl}$, where $K_{bl} \in R^{n \times m}$, to be in accordance with Equation (39) as described below:

$$A_{ref} = A - BK_{bl}^T$$ Equation (39)

The observer module 120 may determine the variable $K_{bl}$ such that a reference observer state matrix $A_{ref}$ described above in Equation (39) becomes Hurwitz (i.e., every eigenvalue of $A_{ref}$ has a strictly negative real part) and has one or more desired modal characteristics. The observer module 120 may apply Equation (38) above to Equation (37) above to determine an observer model described below in Equation (40) and Equation (41) based on the adaptive control input generated by the adaptive control module 220:

$$\dot{x}_{ref} = A_{ref} x_{ref} + B_{ref} y_{cmd}$$ Equation (40)

$$y_{ref} = C_{reg} x_{ref}$$ Equation (41)

In the illustrated example of Equation (40) above and Equation (41) above, the observer model represents an ideal reference observer model. In the illustrated example of Equation (41) above, the output $y_{ref}$ may be designed (e.g., through a proper selection of $K_{bl}$) to adequately track a bounded command $y_{cmd}$ with sufficiently small errors (e.g., errors small enough to avoid destabilizing the vehicle). In some examples, the observer module 120 utilizes the observer model as described above in Equation (40) and Equation (41) to provide additional roll-off in comparison to the roll-off provided by an LQR state feedback. For example, the observer module 120 may provide an approximately 20 dB roll-off to the vehicle system (e.g., the vehicle control apparatus 100, the vehicle control apparatus 200, etc.).

In the illustrated example of Equation (37) above, the observer module 120 does not determine the estimate of the observer state derivative vector $\dot{\hat{x}}$ based on a value of $\hat{A}$. As a result, the observer module 120 may determine an estimate for the variable $\hat{\Theta}$, which may be calculated using Equation (36) as described above. The observer module 120 may apply Equation (36) above to Equation (34) above to yield Equation (42) as described below to describe the observer state vector relationship:

$$\dot{x} = Ax + Bu_{bl} - B\Lambda(\hat{\Theta}^T \Phi(\hat{x}, u_{bl}) - \Theta^T \Phi(x, u_{bl})) + B_{ref} y_{cmd}$$ Equation (42)

The observer module 120 may determine the estimate of the observer state derivative vector $\dot{\hat{x}}$ and the observer state derivative vector $\dot{x}$ based on the two design parameters ($L_v$, $\hat{\Theta}$). For example, the observer module 120 may determine the estimate of the observer state derivative vector $\dot{\hat{x}}$ based on the observer error feedback gain $L_v$ as described above in Equation (37). In another example, the observer module 120 may determine the observer state derivative vector $\dot{x}$ based on the extended unknown constant matrix of parameters as described above in Equation (42). As a result, the observer module 120 may determine a value for the estimate of the state vector $\hat{x}$ that tracks the state of the ideal reference state vector $x_{ref}$ as described above in Equation (40), which in turn implies that the state x tracks $x_{ref}$, and $y_{ref}$ tracks $y_{cmd}$, both with bounded errors.

In the illustrated example of FIG. 2, the vehicle control apparatus 200 includes the error module 230 to determine an error estimation value. The error module 230 may calculate a difference between a measured value of a state of a vehicle parameter and an estimate value of the state of the vehicle parameter. The error module 230 may obtain the measured value of the state of the vehicle parameter from the collection module 170. For example, the error module 230 may identify a first value of a state of an angle of attack parameter of an aircraft, where the first value is measured from the sensor 150 (e.g., the accelerometer of the aircraft) obtained from the collection module 170 via the network 160. The error module 230 may identify a second value of the state of the angle of attack parameter of the aircraft, where the second value is an estimate value of the state of the angle of attack parameter obtained from the observer module 120. The error module 230 may determine a difference between the first value and the second value. In response to the error module 230 determining the difference, the error module 230 may transmit the difference to the observer module 120. For example, the error module 230 may transmit the error estimation value to the observer module 120 to improve the state estimating functions of the observer module 120. In another example, the error module 230 may transmit the error estimation value to the adaptive control module 220 to improve the adaptive control functionality of the adaptive control module 220.

In some examples, the adaptive control module 220 utilizes and/or generates an adaptive control law based on the error estimation value obtained from the error module 230. For example, the state observation error $e_x$ (e.g., $e_x = \hat{x} - x$) may not be available to the vehicle control apparatus 200. However, the output observation error $e_y$ may be available to the vehicle control apparatus 200. For example, the output observation error (e.g., the error estimation value) may be represented by a relationship as described below in Equation (43):

$$e_y = \hat{y} - y = C(\hat{x} - x) = Ce_x \qquad \text{Equation (43)}$$

The estimate of the output vector $\hat{y}$ may be generated by and/or obtained from the observer module 120. The output vector y may be obtained from the collection module 170. The error module 230 may determine the observer error dynamics by determining the difference between the estimate of the observer state vector $\dot{\hat{x}}$ and the observer state vector $\dot{x}$. For example, the error module 230 may subtract Equation (42) above from Equation (37) above. The subtraction may result in Equation (44) as described below:

$$\dot{e}_x = (A - L_v C)e_x + B\Lambda(\hat{\Theta}^T \hat{\Phi}(\hat{x}, u_{bl}) - \Theta^T \Phi(x, u_{bl})) \qquad \text{Equation (44)}$$

In some examples, the error module 230 transmits the observer state observation error $\dot{e}_x$ to the observer module 120 to improve the estimating state functions of the observer module 120. In some instances, the error module 230 transmits the observer state observation error $\dot{e}_x$ to the adaptive control module 220 to improve the adaptive control functionality of the adaptive control module 220 (e.g., generate a new control law, eliminate a control law, modify a control law, etc.).

In some examples, the adaptive control module 220 utilizes and/or generates an adaptive control law (e.g., a stable adaptive law) in accordance with Equation (45) as described below where $\Gamma_\Theta = \Gamma_\Theta^T > 0$:

$$V(e_x, \Delta\overline{\Theta}) = e_x^T P_v^{-1} e_x + \text{trace}(\Lambda \Delta \overline{\Theta}^T \Gamma_\Theta^{-1} \Delta \overline{\Theta}) \qquad \text{Equation (45)}$$

In the illustrated example of Equation (45) above, the variable "$\Gamma_\Theta$" represents the adaptation rate matrix and the variable $\Delta\overline{\Theta}$ represents the matrix of parameter estimation errors where the variable $\Delta\overline{\Theta} = \hat{\overline{\Theta}} - \overline{\Theta}$. The adaptive control module 220 may utilize and/or generate an adaptive law including one or more projection-based adaptive laws as described below in Equation (46):

$$\dot{\hat{\Theta}} = \text{Proj}(\hat{\Theta}, -\Gamma_{\overline{\Theta}}(\hat{x}, u_{bl}) e_y^T R_0^{-1/2} W S^T) \qquad \text{Equation (46)}$$

In the illustrated example of Equation (46) above, the variable S is denoted by the relationship $S = (I_{m \times m} 0_{(p-m) \times m})$. The adaptive control module 220 may use the projection-based adaptive law as described above in Equation (46) with a sufficiently small v (e.g., v>0), to determine that a time derivative of the Lyapunov function as described above in Equation (46) evaluated along the trajectories of the error dynamics of Equation (44) above (e.g., the observer state observation error $\dot{e}_x$) is non-positive as described below in Equation (47):

$$\dot{V}(e_x, \Delta\overline{\Theta}) \le -\left(1 + \frac{1}{v}\right)\lambda_{min}(R_0^{-1})\|e_y\|^2 \le 0 \qquad \text{Equation (47)}$$

In the illustrated example of Equation (47) above, the time derivative of the Lyapunov function is non-positive outside of the compact set of $\Omega_r$ as described below in Equation (48):

$$\Omega_r - \left\{e_x : \|e_x\| \le r = O\left(\frac{v}{\eta}\right)\right\} \qquad \text{Equation (48)}$$

In the illustrated example of Equation (47) above, the error module 230 may determine that in some finite time $T = T(v)$, the observer tracking error $e_x$ enters the maximum level set of V inscribed into the set $\Omega_r$ of Equation (48) above, where V remains afterwards for all $t \ge T$. The error module 230 may determine that the norm of the system state tracking error e (e.g., $e = x - x_{ref}$) is upper-bounded as described below in Equation (49):

$$\|e_x\| =$$

$$\|x - x_{ref}\| = \|x - \hat{x} + \hat{x} - x_{ref}\| \le \|x - \hat{x}\| + \|\hat{x} - x_{ref}\| =$$

$$O\left(\frac{v}{\sqrt{\eta}}\right) + O\left(\frac{1}{\sqrt{\eta}}\right) \qquad \text{Equation (49)}$$

In the illustrated example of Equation (48) above, the observer module 120 may determine the set radius r to be arbitrarily small by selecting a sufficiently small v and/or a sufficiently large $\eta$. Asymptotically, the observer module 120 may decrease the upper bound on the tracking error arbitrarily via a proper selection of v and $\eta$. As a result, the observer module 120 may adjust the performance of the observer model by adjusting the two constants v and $\eta$, where the two constants are the tuning parameters (e.g., the design parameters) of the observer model.

While an example manner of implementing the vehicle control apparatus 200 is illustrated in FIG. 2, one or more of the elements, processes, and/or devices illustrated in FIG. 2 may be combined, divided, re-arranged, omitted, eliminated, and/or implemented in any other way. Further, the example command input module 110, the example observer module 120, the example baseline control module 130, the example vehicle module 140, the example sensor 150, the example network 160, the example collection module 170, the example database 180, the example adder module 210, the example adaptive control module 220, the example error module 230 and/or, more generally, the example vehicle control apparatus 200 of FIG. 2 may be implemented by hardware, software, firmware and/or any combination of hardware, software and/or firmware. Thus, for example, any of the example command input module 110, the example observer module 120, the example baseline control module 130, the example vehicle module 140, the example sensor 150, the example network 160, the example collection module 170, the example database 180, the example adder module 210, the example adaptive control module 220, the example error module 230 and/or, more generally, the example vehicle control apparatus 200 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example command input module 110, the example observer module 120, the example baseline control module 130, the example vehicle module 140, the example sensor 150, the example network 160, the example collection module 170, the example database 180, the example adder module 210, the example adaptive control module 220, the example error module 230 and/or, more generally, the example vehicle control apparatus 200 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example vehicle control apparatus 200 of FIG. 2 may include one or more elements, processes, and/or devices in addition to, or instead of, those illustrated in FIG. 2, and/or may include more than one of any or all of the illustrated elements, processes, and devices.

Figure 3:
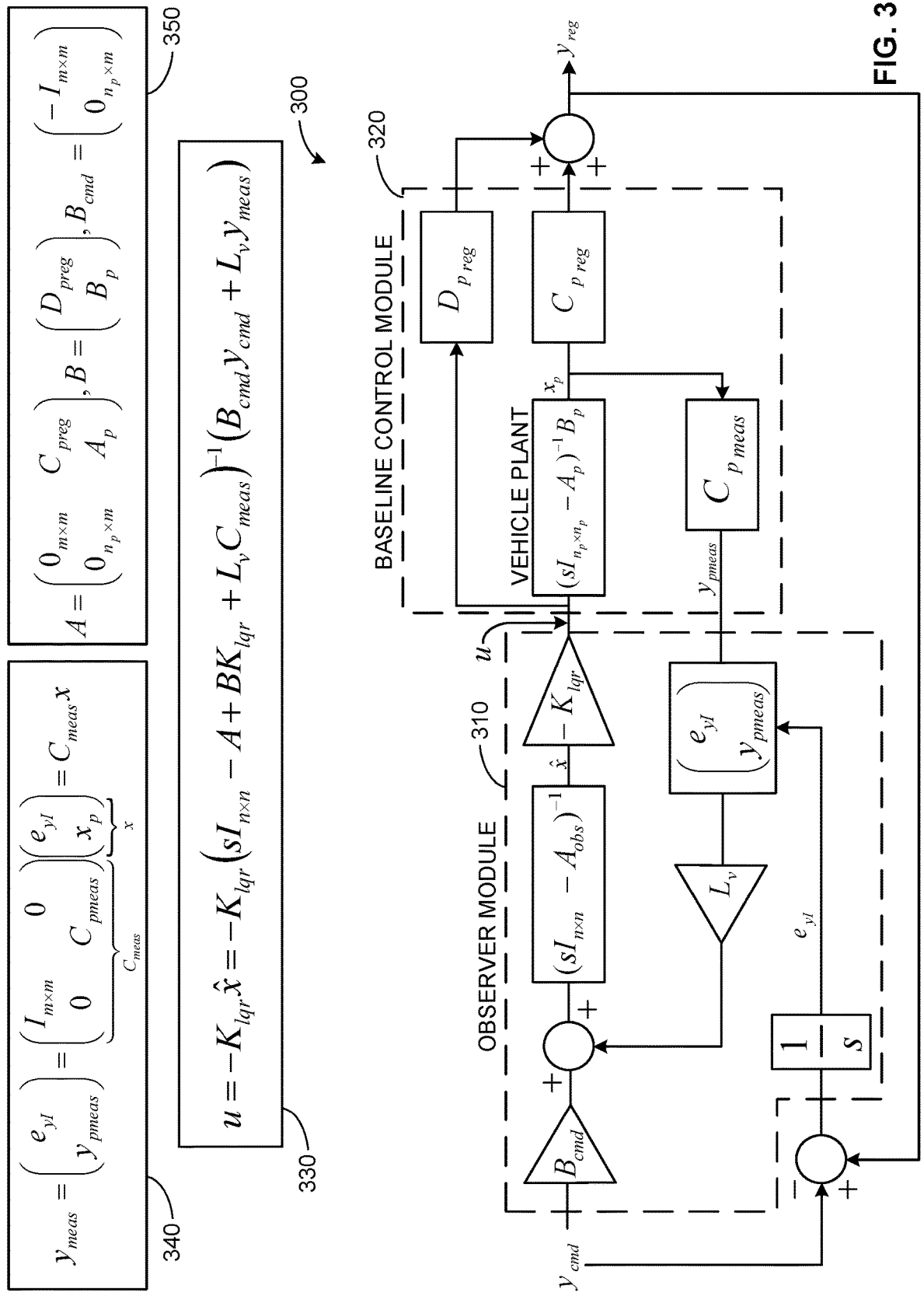
FIG. 3 is a block diagram of a control system of a vehicle that may be used to implement the examples disclosed herein.

FIG. 3 is a block diagram of an example implementation of an example vehicle control apparatus 300. The example vehicle control apparatus 300 is an example implementation of the example vehicle control apparatus 100, 200 of FIGS. 1-2. The example vehicle control apparatus 300 controls a vehicle with a generated command based on a measurement from a sensor. For example, the vehicle control apparatus 300 may control a control surface of an aircraft with a generated control surface command based on a measurement of an aircraft sensor (e.g., an accelerometer, a gyro sensor, etc.). The vehicle control apparatus 300 includes an observer module 310 and a baseline control module 320. The observer module 310 is an example adaptation of the observer module 120 of FIGS. 1 and/or 2. The baseline control module 320 is an example adaptation of the baseline control module 130 of FIGS. 1 and/or 2. Additionally or alternatively, the vehicle control apparatus 300 may include the command input module 110, the observer module 120 (e.g., to implement a dual-observer model of the vehicle), the vehicle module 140, the sensor 150, the network 160, the collection module 170, the database 180, the error module 190, the adder module 210, the adaptive control module 220, and/or the error module 230 of FIGS. 1 and/or 2.

In the illustrated example of FIG. 3, the vehicle control apparatus 300 includes the observer module 310 to at least determine a control input to the baseline control module 320. The observer module 310 obtains a bounded command $y_{cmd}$. In some examples, the observer module 310 obtains the bounded command $y_{cmd}$ from a command input module such as, for example, the command input module 110 from FIGS. 1 and/or 2. The variable $B_{cmd}$ represents a gain command value, the transfer function $(sI_{n \times n} - A_{obs})^{-1}$ represents a transfer function of the observer model utilized by the observer module 310, and the variable $\hat{x}$ represents the estimate of the state vector. The variable $I_{n \times n}$ represents an identity matrix of size n×n. The designator obs in the observer module 310 variables represents the observer model. For example, the variable $A_{obs}$ represents a state matrix of the observer model. In the illustrated example, the variable $K_{lqr}$ represents a LQR constant gain, and the variable $L_v$ represents the observer error feedback gain. In the illustrated example, the variable $e_{yI}$ represents an output observation error based on a difference of the variables $y_{reg}$ and $y_{cmd}$ applied to an integrator transfer function 1/s. The variable $y_{reg}$ represents a regulated output of the baseline control module 320 based on the control input u generated by the observer module 310.

In the illustrated example of FIG. 3, the vehicle control apparatus 300 includes the variable u to represent the control input. In some examples, the control input u includes the adaptive control input $u_{ad}$ as described above. In the illustrated example, the control input u is represented by a relationship as described by an equation in block 330, where the control input u is based on the LQR gain $K_{lqr}$ and the estimate of the state vector 2. In the illustrated example of block 330, the variable $y_{meas}$ represents a measured output of the vehicle control apparatus 300. The measured output $y_{meas}$ also represents the input to the observer error feedback gain $L_v$. The measured output $y_{meas}$ is represented by a relationship as described by an equation in block 340. In the example of block illustrated 340, the measured output $y_{meas}$ is based on the output observation error $e_{yI}$ and the measured plant output $y_{p\ meas}$. The output observation error $e_{yI}$ is based on the identity matrix $I_{m \times m}$, where the identity matrix is size m×m. The measured output $y_{meas}$ is based on the plant measured matrix $C_{p\ meas}$. The matrix $C_{meas}$ represents a measured output matrix and is based on the identity matrix $I_{m \times m}$ and the plant measured matrix $C_{p\ meas}$. In the illustrated example of block 340, the variable x represents a state vector of the vehicle based on the output observation error $e_{yI}$ and the state vector of the vehicle plant $x_p$ (e.g., the state vector of the vehicle). As described in block 340, the measured output $y_{meas}$ is based on the measured output matrix $C_{meas}$ and the state vector x.

In the illustrated example of block 330, the variables A, B, and $B_{cmd}$ represent the state matrix of the vehicle, the input matrix of the vehicle, and the gain command matrix of the vehicle, respectively. The variables A, B, and $B_{cmd}$ are represented by the equations as described in block 350. In the illustrated example, the state matrix A is based on the variables $0_{m \times m}$, $0_{n_p \times m}$, $C_{p\ reg}$ and A. The variable $0_{m \times m}$ represents a zero matrix of size m×m, the variable $0_{n_p \times m}$ represents a zero matrix of size $n_p$×m, the variable $C_{p\ reg}$ represents a regulated output matrix of the vehicle plant, and the variable $A_p$ represents the state matrix of the vehicle plant. In the illustrated example, the input matrix B is based on $D_{p\ reg}$ and $B_p$. The variable $D_{p\ reg}$ represents a regulated feedforward matrix of the vehicle plant, and the variable $B_p$ represents an input matrix of the vehicle plant. In the illustrated example, the gain command matrix $B_{cmd}$ is based on the variables $-I_{m \times m}$ and the variable $0_{n_p \times m}$. The variable $-I_{m \times m}$ represents a negative identity matrix of size m×m and the variable $0_{n_p \times m}$ represents a zero matrix of size $n_p$×m.

In the illustrated example of FIG. 3, the vehicle control apparatus 300 includes the vehicle plant $(sI_{n_p \times n_p} - A_p)^{-1} B_p$ to represent the vehicle. For example, the vehicle plant may represent an air-based vehicle (e.g., an aircraft), a land-based vehicle (e.g., an automobile, a bus, a train, etc.), a marine vehicle (e.g., a boat, a submarine), etc. In some examples, the vehicle plant is a component of the vehicle. For example, the vehicle plant may be a control surface operatively coupled to a wing of an aircraft, an actuator operatively coupled to a valve of a marine vehicle, etc. The variable $I_{n_p \times n_p}$ represents an identity matrix of size $n_p$×$n_p$. The designator p in the baseline control module 320 variables represents the plant. For example, the variable $A_p$ represents a state matrix of the vehicle plant, the variable $B_p$ represents an input matrix of the vehicle plant, the variable $x_p$ represents a state of the vehicle plant, the variable $I_{n_p \times n_p}$ represents an identity matrix of the vehicle plant, etc. In the illustrated example, the variable $C_{p\ reg}$ represents a regulated output matrix of the vehicle plant, the variable $D_{p\ reg}$ represents a regulated feedforward matrix of the vehicle plant, and the variable $C_{p\ meas}$ represents a measured output matrix of the vehicle plant.

In the illustrated example of FIG. 3, the vehicle control apparatus 300 utilizes the observer module 310 to determine the estimate of the state vector $\hat{z}$ of an observer model based on the bounded command $y_{cmd}$. The observer module 310 may improve the estimating functions of the observer module 310 (e.g., determining the estimate of the state vector $\hat{x}$) by determining the output observation error $e_{y,I}$. The observer module 310 may improve the estimating functions of the observer module 310 by obtaining the measured plant output $y_{p\ meas}$ from the baseline control module 320. In some examples, the observer module 310 obtains the measured plant output $y_{p\ meas}$ from a collection module (e.g., the collection module 170 of FIGS. 1 and/or 2), a sensor (e.g., the sensor 150 of FIGS. 1 and/or 2), etc.

Figure 4:
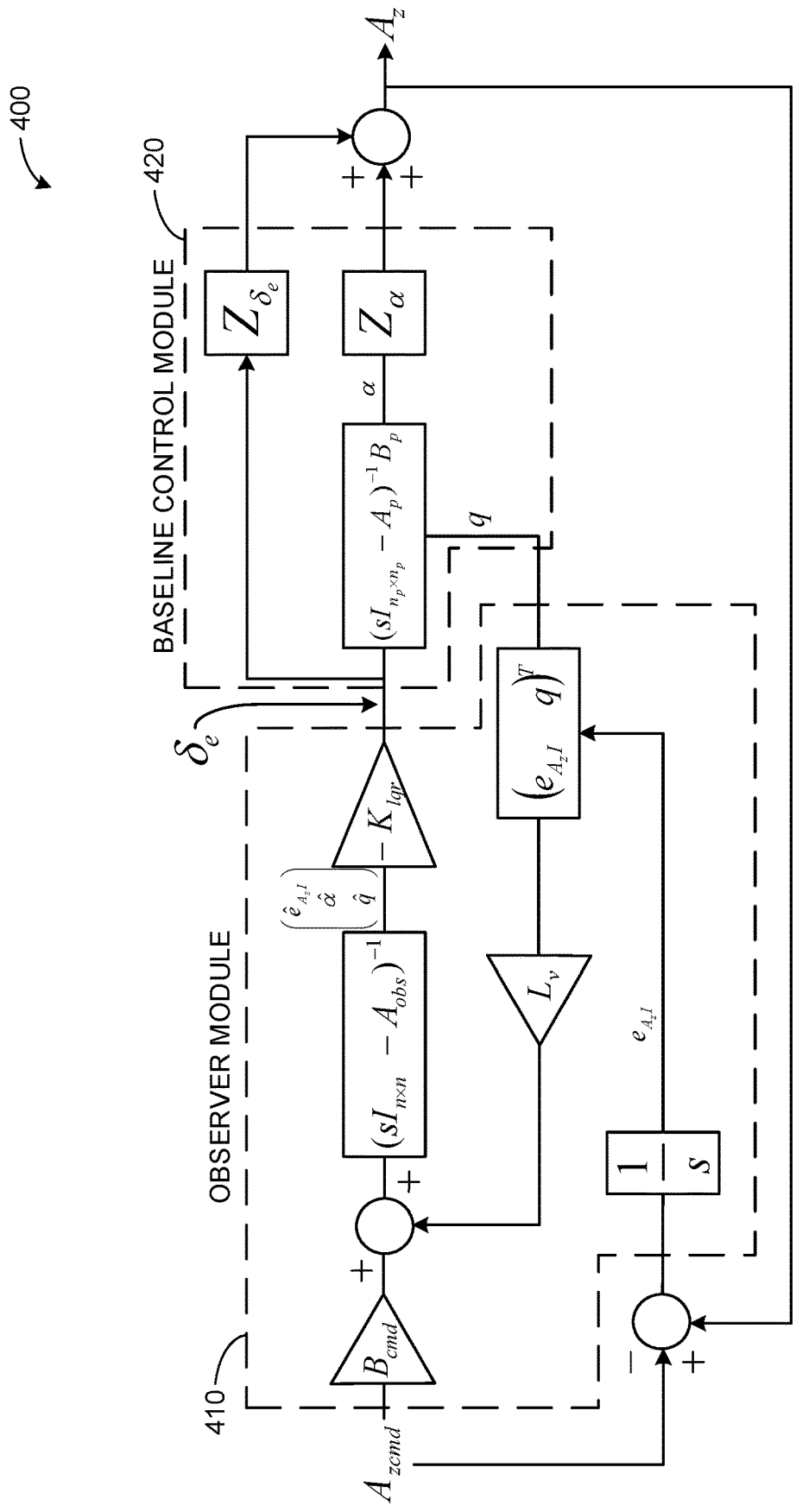
FIG. 4 is a block diagram of a longitudinal (pitch) control system of an aircraft that may be used to implement the examples disclosed herein.

FIG. 4 is a block diagram of an example implementation of a vehicle control apparatus 400 that performs flight control of an aircraft. In the illustrated example, the vehicle control apparatus 400 performs control of a pitch rate of the aircraft. The vehicle control apparatus 400 determines an estimate of a state of the pitch rate q based on a pitch rate command $A_{z\ cmd}$. In the illustrated example, the vehicle control apparatus 400 determines a pitch rate command output $A_z$ based on a pitch rate control input $\delta_e$. In some examples, the control input $\delta_e$ includes the adaptive control input $u_{ad}$ as described above.

In the illustrated example of FIG. 4, the vehicle control apparatus 400 includes an example observer module 410 and an example baseline control module 420. The observer module 410 is an example adaptation of the observer module 120 of FIGS. 1 and/or 2. The baseline control module 420 is an example adaptation of the baseline control module 130 of FIGS. 1 and/or 2. Additionally or alternatively, the vehicle control apparatus 400 may include the command input module 110, the observer module 120 (e.g., to implement a dual-observer model of the vehicle), the vehicle module 140, the sensor 150, the network 160, the collection module 170, the database 180, the error module 190, the adder module 210, the adaptive control module 220, and/or the error module 230 of FIGS. 1 and/or 2.

In the illustrated example of FIG. 4, the observer module 410 includes a gain command value $B_{cmd}$, a transfer function of the observer model $(sI_{n\times n} - A_{ops})^{-1}$ (e.g., a dynamic compensator), a LQR constant gain $K_{lqr}$, and an observer error feedback gain $L_v$. In the illustrated example, the variable $e_{A_zI}$ represents an output observation error based on a difference of the variables $A_z$ and $A_{z\ cmd}$ applied to an integrator transfer function $1/s$. In the illustrated example, the variable $\hat{e}_{A_zI}$ represents an estimate of an output observation error and the variable a represents an estimate of a state of an angle of attack parameter of the aircraft.

In the illustrated example of FIG. 4, the baseline control module 420 includes an aircraft plant $(sI_{n_p\times n_p} - A_p)^{-1}B_p$ to represent the aircraft. The designator p utilized in the baseline control module 420 represents the aircraft plant. For example, the variable $A_p$ represents a state matrix of the aircraft plant and the variable $B_p$ represents an input matrix of the aircraft plant. In the illustrated example, the baseline control module 420 includes an output angle of attack parameter matrix $Z_\alpha$ and a feedforward control input matrix $Z_{\delta_e}$. In the illustrated example, the variable $\alpha$ represents an angle of attack vector (e.g., a measured angle of attack vector) and the variable q represents a pitch angle vector (e.g., a measured pitch angle vector). For example, the angle of attack vector and the pitch angle vector may represent states (e.g., measured states) of the aircraft plant.

Figure 5:
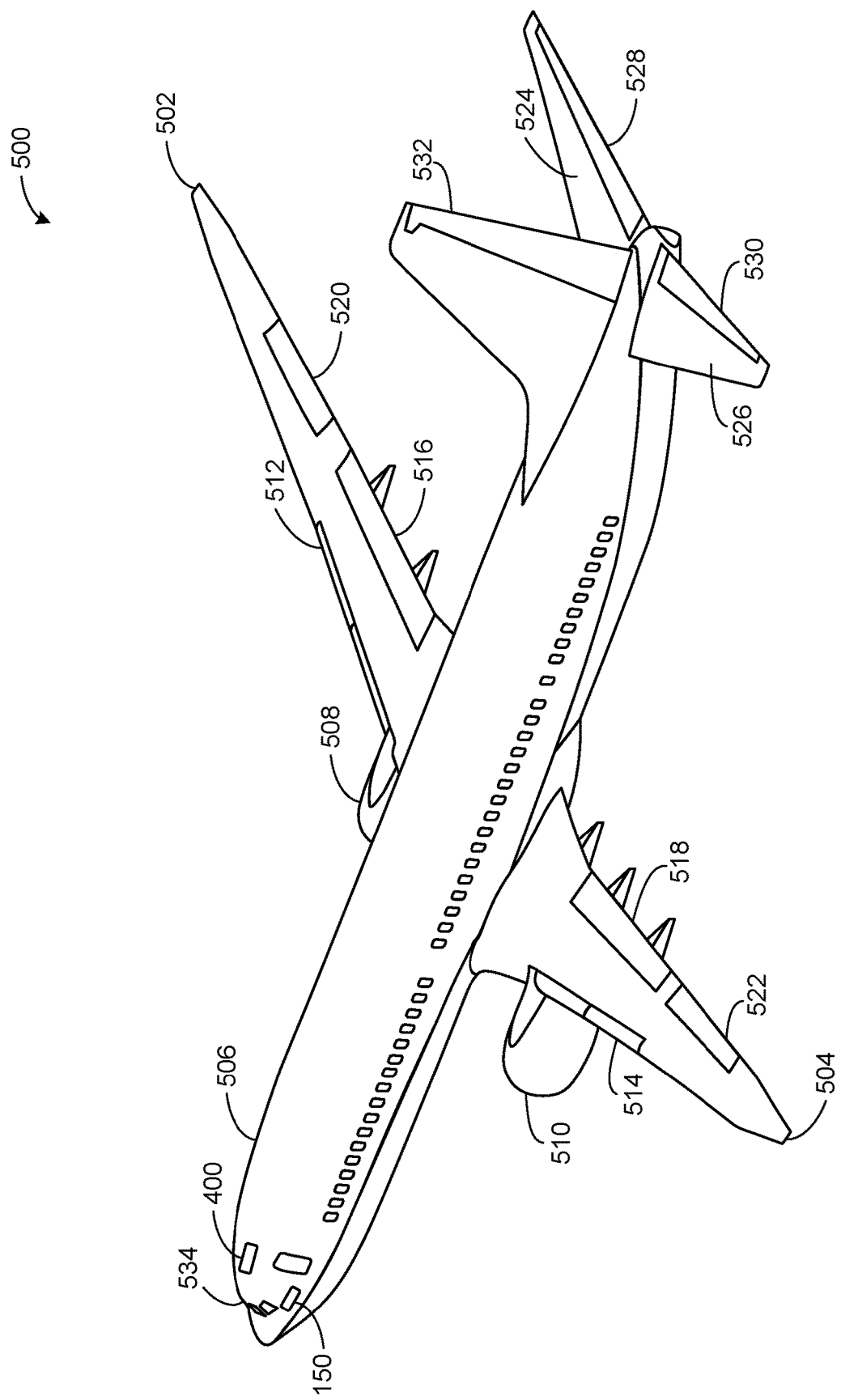
FIG. 5 is a schematic illustration of an aircraft that may implement the examples disclosed herein.

FIG. 5 is a schematic illustration of an aircraft 500. The aircraft 500 includes wings 502, 504 coupled to a fuselage 506. Engines 508, 510 are coupled to the wings 502, 504. Slats 512, 514, flaps 516, 518, and ailerons 520, 522 are operatively coupled to the wings 502, 504. Additional aircraft control surfaces of the aircraft 500 include horizontal stabilizers 524, 526 operatively coupled to elevators 528, 530 and a vertical stabilizer 532 coupled to the fuselage 506.

In the illustrated example of FIG. 5, the aircraft 500 includes an example vehicle control apparatus 400 to perform observer-based control of the aircraft and/or one or more control surfaces of the aircraft 500. There is one example vehicle control apparatus 400 located proximate a cockpit 534 of the aircraft 500, however the vehicle control apparatus 400 may have one or more components located elsewhere on the aircraft 500. Although there is one example vehicle control apparatus 400 depicted in the illustrated example, there may be more than one vehicle control apparatus 400 included in the aircraft implementation where observer-based control is performed. Additionally or alternatively, the aircraft 500 may include one or more of the vehicle control apparatus 100, 200, 300 of FIGS. 1-3.

In the illustrated example of FIG. 5, the vehicle control apparatus 400 performs observer-based control of the aircraft 500. For example, the vehicle control apparatus 400 may perform observer-based control of the aircraft 500 based on the sensor 150 of FIGS. 1-2. The vehicle control apparatus 400 may determine a first state of one or more control surfaces of the aircraft 500. For example, the vehicle control apparatus 400 may determine a first state of the elevators 528, 530. The vehicle control apparatus 400 may determine a second state (e.g., an estimate of a state) of the one or more control surfaces of the aircraft 500 based on the aircraft 500 executing a command. For example, the vehicle control apparatus 400 may determine the second state (e.g., the estimate of the state) of the elevators 528, 530 based on the elevators 528, 530 executing the command. The vehicle control apparatus 400 may also determine a third state of the one or more control surfaces of the aircraft 500 (e.g., an updated estimate of the second state) based on the difference between the first state and the second state. For example, the vehicle control apparatus 400 may also determine a third state of the elevators 528, 530 based on the difference between the first state and the second state of the elevators 528, 530. The vehicle control apparatus 400 may determine and/or generate a control input (e.g., a control input based on a baseline control input and/or an adaptive control input) or a command to control the one or more control surfaces of the aircraft 500. For example, the vehicle control apparatus 400 may determine and/or generate the control input or the command to control the elevators 528, 530 based on the difference between the first state and the second state. In response to the generation of the command, the aircraft 500 may execute the command. For example, the elevators 528, 530 may move to a second position from a first position in response to the elevators 528,530 executing the command.

Figure 6:
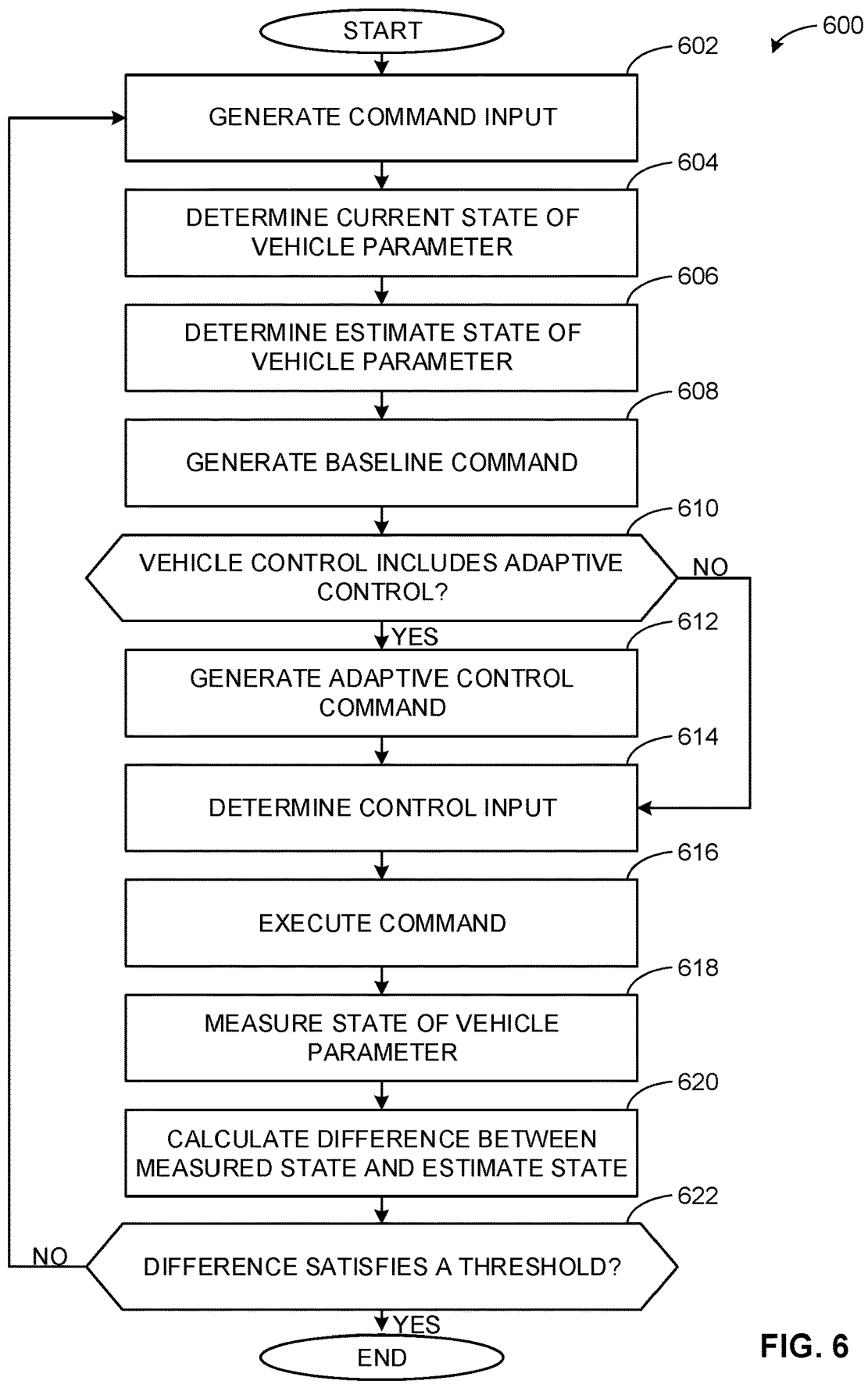
FIG. 6 is a flowchart representative of an example method that may be used to implement the control system of FIGS. 1-4.

A flowchart representative of an example method for implementing the example vehicle control apparatus 100, 200, 300, 400 of FIGS. 1-4 is shown in FIG. 6. In this example, the method may be implemented using machine readable instructions that comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 6, many other methods of implementing the example vehicle control apparatus 100, 200, 300, 400 may alternatively be used. For example, the order of execution of the blocks may be changed, and/or some of the blocks described may be changed, eliminated, or combined.

As mentioned above, the example method of FIG. 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 6 is a flowchart representative of an example method 600 that may be performed by the example vehicle control apparatus 100, 200, 300, 400 of FIGS. 1-4 to perform observer-based control of a vehicle. The example method 600 begins at block 602 when the vehicle control apparatus 100, 200, 300, 400 generates a command input. For example, the command input module 110 may generate a command input for an aircraft based on user input (e.g., a command from a pilot), a value from the database 180, a measurement of a sensor obtained from the collection module 170, a guidance module, etc. At block 604, the vehicle control apparatus 100, 200, 300, 400 determines a current state of a vehicle parameter. For example, the observer module 120 may determine an initial state of an angle of attack parameter of the aircraft. At block 606, the vehicle control apparatus 100, 200, 300, 400 determines an estimate of a state of the vehicle parameter. For example, the observer module 120 may determine an estimate of the state of the angle of attack parameter of the aircraft based on an observer model of the vehicle.

At block 608, the vehicle control apparatus 100, 200, 300, 400 generates a baseline command. For example, the baseline control module 130 may generate a baseline command for the aircraft based on the estimate of the state of the angle of attack parameter of the aircraft. At block 610, the vehicle control apparatus 100, 200, 300, 400 determines whether vehicle control includes adaptive control. For example, the adaptive control module 220 may modify a value of a flag (e.g., a flag in computer and/or machine readable instructions) alerting the vehicle control apparatus 200 that the adaptive control module 220 exists and/or functions. If, at block 610, the vehicle control apparatus 100, 200, 300, 400 determines that the vehicle control does not include adaptive control, control proceeds to block 614 to determine a control input. If, at block 610, the vehicle control apparatus 100, 200, 300, 400 determines that the vehicle control does include adaptive control, then, at block 612, the vehicle control apparatus 100, 200, 300, 400 generates an adaptive control command. For example, the adaptive control module 220 may generate an adaptive control command for the aircraft based on a control law (e.g., an adaptive control law).

At block 614, the vehicle control apparatus 100, 200, 300, 400 determines the control input. For example, the baseline control module 130 may determine the control input (e.g., the control input u) based on the guidance command (e.g., the guidance command r) and/or the estimate of the state of the angle of attack parameter for the aircraft. In another example, the adder module 210 may determine the control input (e.g., the control input u) based on the baseline control command (e.g., the baseline control input $u_{bl}$) and/or the adaptive control command (e.g., the adaptive control input $u_{ad}$). At block 616, the vehicle control apparatus 100, 200, 300, 400 executes a command. For example, the vehicle module 140 may execute the command based on the control input (e.g., the control input u). At block 618, the vehicle control apparatus 100, 200, 300, 400 measures a state of the vehicle parameter. For example, the collection module 170 may measure the state of the angle of attack parameter based on a measurement from a sensor (e.g., an acceleration sensor, an angular rate sensor, etc.). In another example, the observer module 120 may measure the state of the angle of attack parameter based on the measurement from the sensor 150 obtained by the collection module 170.

At block 620, the vehicle control apparatus 100, 200, 300, 400 calculates a difference between the measured state and the estimate of the state. For example, the error module 190 may determine the difference between (1) the measured state of the angle of attack parameter based on the measurement from the sensor 150 obtained by the collection module 170 and (2) the estimate of the state of the angle of attack parameter determined by the observer module 120. In another example, the error module 230 may determine the difference between (1) the measured state of the angle of attack parameter based on the measurement from the sensor 150 obtained by the collection module 170 and (2) the estimate of the state of the angle of attack parameter determined by the observer module 120. At block 622, the vehicle control apparatus 100, 200, 300, 400 determines whether the difference satisfies a threshold. For example, the observer module 120 may determine whether the difference satisfies an estimation error threshold (e.g., the difference is greater than 5 degrees, the difference is less than 10 radians/second, etc.). If, at block 622, the vehicle control apparatus 100, 200, 300, 400 determines that the difference does not satisfy the threshold, control returns to block 602 to generate another guidance command, otherwise the example method 600 concludes.

Figure 7:
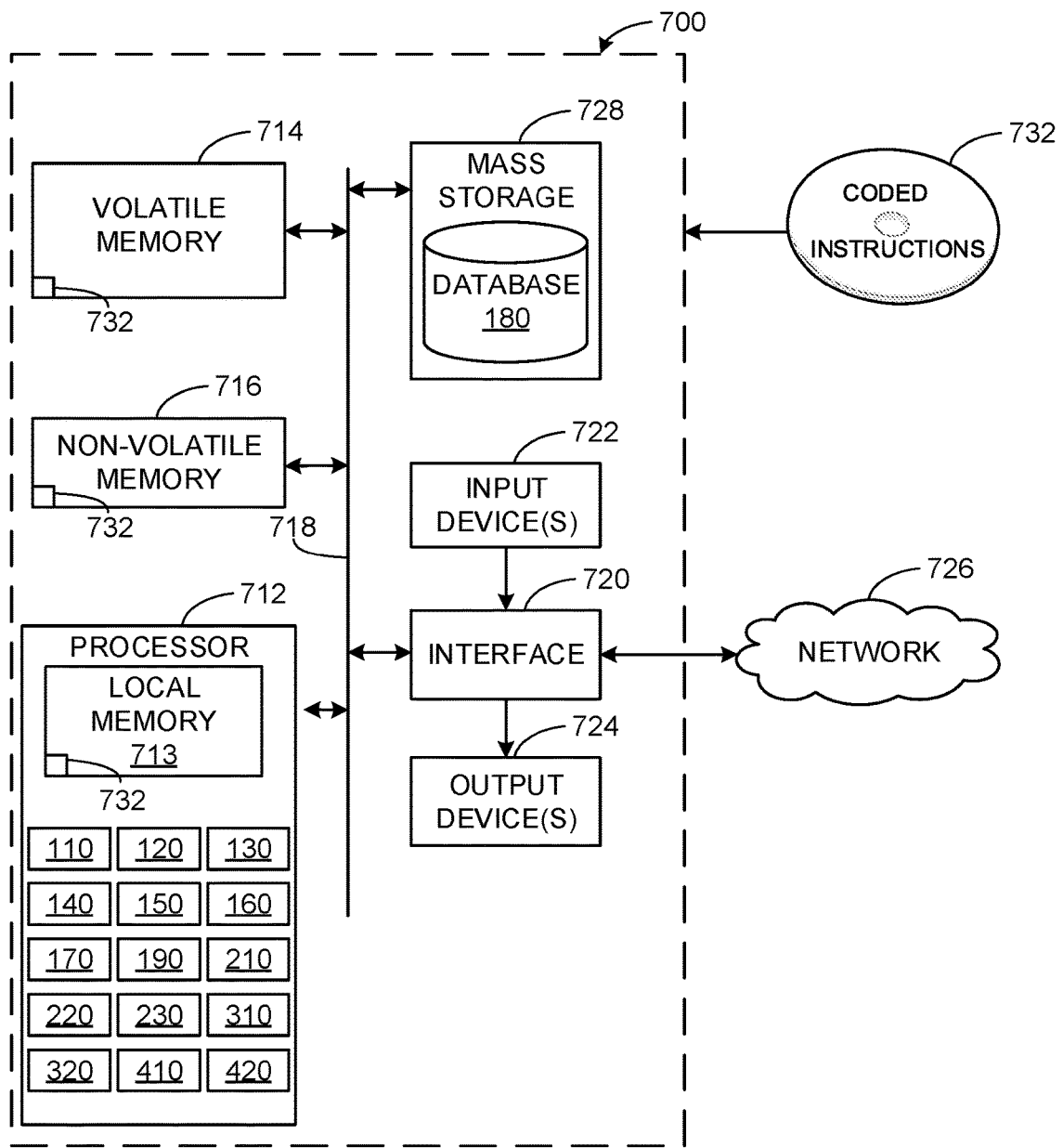
FIG. 7 is a block diagram of an example processing platform structured to execute machine-readable instructions to implement the method of FIG. 6 and the example vehicle control apparatus of FIGS. 1-4.

FIG. 7 is a block diagram of an example processor platform 700 capable of executing instructions to implement method of FIG. 6 and the vehicle control apparatus 100, 200, 300, 400 of FIGS. 1-4. The processor platform 700 can be, for example, an aircraft computer, an industrial computer, a server, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example executes the instructions to implement the example vehicle control apparatus 100, 200, 300, 400 comprising the example command input module 110, the example observer module 120, the example baseline control module 130, the example vehicle module 140, the example sensor 150, the example network 160, the example collection module 170, the example error module 190, the example adder module 210, the example adaptive control module 220, the example error module 230, the example observer module 310, the example baseline control module 320, the example observer module 410, and the example baseline control module 420. The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 724 are also connected to the interface circuit 720 of the illustrated example. The output devices 724 can be implemented, for example, by display devices (e.g., a heads-up display, a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip, or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, magnetic media, compact disk drives, Blu-ray disk drives, RAID systems, and digital versatile disk (DVD) drives. The example mass storage 728 implements the example database 180.

Coded instructions 732 to implement the method of FIG. 6 may be stored in the mass storage device 728, in the volatile memory 714, in the non-volatile memory 716, and/or on a removable tangible computer-readable storage medium such as a CD or DVD.

From the foregoing, it will be appreciated that the above disclosed methods, apparatus, and articles of manufacture provide observer-based control of a vehicle. The above disclosed vehicle control apparatus can determine a command to control the vehicle based on determining and/or estimating one or more states of a vehicle parameter. The above disclosed vehicle control apparatus can perform state feedback margin recovery while increasing robustness at high frequencies. In addition, the above disclosed vehicle control apparatus may implement adaptive control to control the vehicle when one or more vehicle parameter states are unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   an observer module to determine a first state of a vehicle based on a difference between a second state of the vehicle and a third state of the vehicle, the second state based on a bounded command, the third state based on a measurement from a sensor, the observer module is to determine the first state by:
   determining a sum based on applying an observer error feedback gain and a gain command value to the second state, the observer error feedback gain based on an output observation error and a measured plant output, the output observation error based on an identity matrix, the measured plant output based on the sensor; and
   executing a transfer function using the sum to generate the first state;
   a baseline control module to generate a first command based on the first state; and
   a vehicle module to execute the first command to control the vehicle by moving a control surface from a first position to a second position.

2. The apparatus of claim 1, wherein the identity matrix is a first identity matrix and the transfer function includes a first matrix and a second matrix, the first matrix corresponding to a second identity matrix different from the first identity matrix, the second matrix corresponding to a state matrix of an observer model.

3. The apparatus of claim 1, wherein the observer module is to estimate the second state by performing a squaring-up modification on an input matrix to determine a pseudo-input matrix, wherein the pseudo-input matrix includes a number of inputs equal to a number of outputs in an output matrix.

4. The apparatus of claim 3, wherein the observer module is to estimate the second state by calculating one or more transmission zeros in an open left half of a complex plane based on the pseudo-input matrix.

5. The apparatus of claim 1, wherein determining the second state includes calculating at least one of an angle of attack parameter or a sideslip parameter based on the measurement from the sensor, the sensor including at least one of an acceleration sensor, a gyro sensor, or an angular rate sensor.

6. The apparatus of claim 1, further including an adaptive control module to generate a control law to determine an adaptive control command based on the first state.

7. The apparatus of claim 1, wherein the first command is based on a control input, the observer module is to generate the control input by applying a constant Linear Quadratic Regulator baseline control gain to the first state.

8. A non-transitory computer readable medium comprising instructions which, when executed, cause a machine to at least:
   determine a first state of a vehicle based on a difference between a second state of the vehicle and a third state of the vehicle, the second state based on a bounded command, the third state based on a measurement from a sensor, the machine is to determine the first state by:
      determining a sum based on applying an observer error feedback gain and a gain command value to the second state, the observer error feedback gain based on an output observation error and a measured plant output, the output observation error based on an identity matrix, the measured plant output based on the sensor; and
      executing a transfer function using the sum to generate the first state;
   generate a first command based on the first state; and
   execute the first command to control the vehicle by moving a control surface from a first position to a second position.

9. The non-transitory computer readable medium of claim 8, wherein the identity matrix is a first identity matrix and the transfer function includes a first matrix and a second matrix, the first matrix corresponding to a second identity matrix different from the first identity matrix, the second matrix corresponding to a state matrix of an observer model.

10. The non-transitory computer readable medium of claim 8, wherein the instructions, when executed, cause the machine to estimate the second state by performing a squaring-up modification on an input matrix to determine a pseudo-input matrix, wherein the pseudo-input matrix includes a number of inputs equal to a number of outputs in an output matrix.

11. The non-transitory computer readable medium of claim 10, wherein the instructions, when executed, cause the machine to estimate the second state by calculating one or more transmission zeros in an open left half of a complex plane based on the pseudo-input matrix.

12. The non-transitory computer readable medium of claim 8, wherein the instructions, when executed, cause the machine to determine the second state by calculating at least one of an angle of attack parameter or a sideslip parameter based on the measurement from the sensor, the sensor including at least one of an acceleration sensor, a gyro sensor, or an angular rate sensor.

13. The non-transitory computer readable medium of claim 8, wherein the instructions, when executed, cause the machine to generate a control law to determine an adaptive control command based on the first state.

14. The non-transitory computer readable medium of claim 8, wherein the first command is based on a control input, and the instructions, when executed, cause the machine to generate the control input by applying a constant Linear Quadratic Regulator baseline control gain to the first state.

15. A method comprising:
   determining a first state of a vehicle based on a difference between a second state of the vehicle and a third state of the vehicle, the second state based on a bounded command, the third state based on a measurement from a sensor, the determining of the first state including:
      determining a sum based on applying an observer error feedback gain and a gain command value to the second state, the observer error feedback gain based on an output observation error and a measured plant output, the output observation error based on an identity matrix, the measured plant output based on the sensor; and
      executing a transfer function using the sum to generate the first state;
   generating a first command based on the first state; and
   executing the first command to control the vehicle by moving a control surface from a first position to a second position.

16. The method of claim 15, wherein the identity matrix is a first identity matrix and the transfer function includes a first matrix and a second matrix, the first matrix corresponding to a second identity matrix different from the first identity matrix, the second matrix corresponding to a state matrix of an observer model.

17. The method of claim 15, wherein estimating the second state includes performing a squaring-up modification on an input matrix to determine a pseudo-input matrix, wherein the pseudo-input matrix includes a number of inputs equal to a number of outputs in an output matrix.

18. The method of claim 17, wherein estimating the second state includes calculating one or more transmission zeros in an open left half of a complex plane based on the pseudo-input matrix.

19. The method of claim 15, wherein determining the second state includes calculating at least one of an angle of attack parameter or a sideslip parameter based on the measurement from the sensor, the sensor including at least one of an acceleration sensor, a gyro sensor, or an angular rate sensor.

20. The method of claim 15, further including generating a control law to determine an adaptive control command based on the first state.

21. The method of claim 15, wherein the first command is based on a control input, and further including generating the control input by applying a constant Linear Quadratic Regulator baseline control gain to the first state.

* * * * *